(12) United States Patent
Lee et al.

(10) Patent No.: US 11,244,676 B2
(45) Date of Patent: Feb. 8, 2022

(54) APPARATUS FOR PROCESSING USER VOICE INPUT

(71) Applicant: Samsung Electronics Co., Ltd., Gyeonggi-do (KR)

(72) Inventors: Jemin Lee, Gyeonggi-do (KR); Hoon Choi, Gyeonggi-do (KR); Yongseok Park, Gyeonggi-do (KR); Dongho Jang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 352 days.

(21) Appl. No.: 16/352,341

(22) Filed: Mar. 13, 2019

(65) Prior Publication Data

US 2019/0287527 A1    Sep. 19, 2019

(30) Foreign Application Priority Data

Mar. 13, 2018    (KR) .................. 10-2018-0029337

(51) Int. Cl.
*G10L 15/22*    (2006.01)
*G10L 15/30*    (2013.01)
*H04L 29/06*    (2006.01)

(52) U.S. Cl.
CPC .............. *G10L 15/22* (2013.01); *G10L 15/30* (2013.01); *G10L 2015/223* (2013.01); *H04L 67/42* (2013.01)

(58) Field of Classification Search
CPC .... G10L 15/22; G10L 15/30; G10L 2015/223
See application file for complete search history.

(56) References Cited

U.S. PATENT DOCUMENTS 5,890,166 A * 3/1999 Eisenberg ............. G06F 16/219
8,762,156 B2   6/2014 Chen
(Continued)

FOREIGN PATENT DOCUMENTS

EP    3 010 015      4/2016
KR    1020060055313  5/2006
(Continued)

OTHER PUBLICATIONS

International Search Report dated Jul. 4, 2019 issued in counterpart application No. PCT/KR2019/002923, 10 pages.
(Continued)

*Primary Examiner* — Jakieda R Jackson
(74) *Attorney, Agent, or Firm* — The Farrell Law Firm, P.C.

(57) ABSTRACT

An electronic device is provided. The electronic device includes a processor, and a memory storing an application program supporting a task and a database including a first path rule for performing the task. The first path rule includes a plurality of first states of the electronic device. The memory stores instructions that cause the processor to receive a voice command making a request for performing the task to transmit the voice command to an external server, to receive a second path rule including a plurality of second states of the electronic device for performing the task to execute the plurality of second states included in the second path rule, in response to the reception of the second path rule, and when an error occurs during the execution of the plurality of second states, to execute at least part of the plurality of first states included in the first path rule.

20 Claims, 14 Drawing Sheets

(56) References Cited

U.S. PATENT DOCUMENTS

| | | |
|---|---|---|
| 8,812,316 B1 | 8/2014 | Chen |
| 8,942,985 B2 | 1/2015 | Mowatt et al. |
| 9,619,283 B2 | 4/2017 | Wu et al. |
| 9,893,940 B1 * | 2/2018 | Chawla ............... H04L 41/0816 |
| 9,959,129 B2 | 5/2018 | Kannan et al. |
| 9,972,317 B2 | 5/2018 | Mowatt et al. |
| 10,546,587 B2 | 1/2020 | Chakladar et al. |
| 10,770,074 B1 * | 9/2020 | Vijayvergia ............. G06F 3/167 |
| 2006/0106614 A1 | 5/2006 | Mowatt et al. |
| 2007/0113211 A1 * | 5/2007 | Zhang ................ G06F 30/3312 716/108 |
| 2008/0306910 A1 * | 12/2008 | Singh .................... G06F 16/832 |
| 2013/0080177 A1 | 3/2013 | Chen |
| 2014/0163976 A1 * | 6/2014 | Park ........................ G10L 15/00 704/231 |
| 2015/0095030 A1 | 4/2015 | Mowatt et al. |
| 2015/0310864 A1 | 10/2015 | Li et al. |
| 2016/0104484 A1 | 4/2016 | Chakladar et al. |
| 2016/0203002 A1 | 7/2016 | Kannan et al. |
| 2017/0031711 A1 | 2/2017 | Wu et al. |
| 2017/0032786 A1 | 2/2017 | Mowatt et al. |
| 2018/0363337 A1 * | 12/2018 | Zhu .................... G06K 9/00798 |

FOREIGN PATENT DOCUMENTS

| | | |
|---|---|---|
| KR | 1020130034630 | 4/2013 |
| KR | 10-1394849 | 5/2014 |
| KR | 1020150043272 | 4/2015 |
| KR | 1020150103222 | 9/2015 |
| KR | 1020160059026 | 5/2016 |
| KR | 1020180022021 | 3/2018 |

OTHER PUBLICATIONS

European Search Report dated Mar. 24, 2021 issued in counterpart application No. 19767797.4-1203, 8 pages.

* cited by examiner

| Path rule ID | Pair id | Server Request | Parameter 1 | Parameter 2 |
|---|---|---|---|---|
| Message_001 | M_01 | Yes | - | - |
| Message_004 | M_01 | No | Parameter2 | Parameter1 |
| Message_070 | M_02 | No | - | - |
| Message_102 | M_02 | No | Parameter1 | Parameter2 |

APPARATUS FOR PROCESSING USER VOICE INPUT

CROSS-REFERENCE TO RELATED APPLICATION(S)

This application is based on and claims priority under 35 U.S.C. § 119 to Korean Patent Application Serial No. 10-2018-0029337, filed on Mar. 13, 2018, in the Korean Intellectual Property Office, the entire disclosure of which is incorporated herein by reference.

BACKGROUND

1. Field

The present disclosure relates generally to an apparatus processing a user voice input.

2. Description of Related Art

Electronic devices such as smartphones and tablets may process an input using a keyboard or a mouse or an input by interactive voice commands. The electronic device may execute a speech recognition service (or speech recognition application) to recognize a user's utterance and may perform an operation corresponding to the utterance.

The speech recognition service may provide the user with the result corresponding to the user's utterance, using a specified phrase included in the user's utterance. The speech recognition service may grasp the user's intent from the utterance based on a natural language processing technology and may provide the user with a response or a result matched to the grasped intent.

A speech recognition service may be provided by an intelligent server capable of recognizing the user's utterance and analyzing the intent of that utterance. When the user's utterance is obtained, the electronic device may transmit the obtained utterance to the intelligent server. The electronic device may receive instructions corresponding to the utterance of the user analyzed by the intelligent server and may execute the function matched to the user's intent by executing the received instructions.

Generally, the intelligent server may transmit one instruction, which is most matched to the user's intent, to the electronic device. When the electronic device does not execute the received instruction, the electronic device fails to provide a response to the user's utterance.

SUMMARY

The present disclosure has been made to address at least the disadvantages described above and to provide at least the advantages described below.

Accordingly, an aspect of the disclosure is to provide an electronic device capable of performing a function matched to a user's intent in another manner capable of performing a function the same as an instruction when the instruction received from an intelligent server is not capable of being executed.

In accordance with an aspect of the present disclosure, an electronic device is provided. The electronic device includes a microphone, a wireless communication circuit, at least one processor, and a memory storing an application program supporting a task and a database including a first path rule for performing the task. The first path rule may include a plurality of first states of the electronic device. The memory may store instructions that, when executed, cause the at least one processor to receive a voice command making a request for performing the task, via the microphone, to transmit the voice command to an external server via the wireless communication circuit, to receive a second path rule including a plurality of second states of the electronic device for performing the task, from the external server via the wireless communication circuit, to execute the plurality of second states included in the second path rule, in response to the reception of the second path rule, and when an error occurs during the execution of the plurality of second states, to execute at least part of the plurality of first states included in the first path rule.

In accordance with an aspect of the present disclosure, an electronic device is provided. The electronic device may include a microphone, a wireless communication circuit, at least one processor, and a memory configured to store an application program supporting a task and a database including a first path rule for performing the task. The first path rule includes a plurality of first states of the electronic device. The memory stores instructions that, when executed, cause the at least one processor to receive a voice command making a request for performing the task via the microphone, transmit the voice command to an external server via the wireless communication circuit, receive a second path rule including a plurality of second states of the electronic device for performing the task from the external server via the wireless communication circuit, execute the plurality of second states included in the second path rule, in response to the reception of the second path rule, and when an error occurs during the execution of the plurality of second states, execute at least part of the plurality of first states included in the first path rule.

BRIEF DESCRIPTION OF THE DRAWINGS

The above and other aspects, features and advantages of certain embodiments of the disclosure will be more apparent from the following detailed description taken in conjunction with the accompanying drawings, in which:

FIG. 8A is an diagram of table data, according to an embodiment;

DETAILED DESCRIPTION

Figure 1:
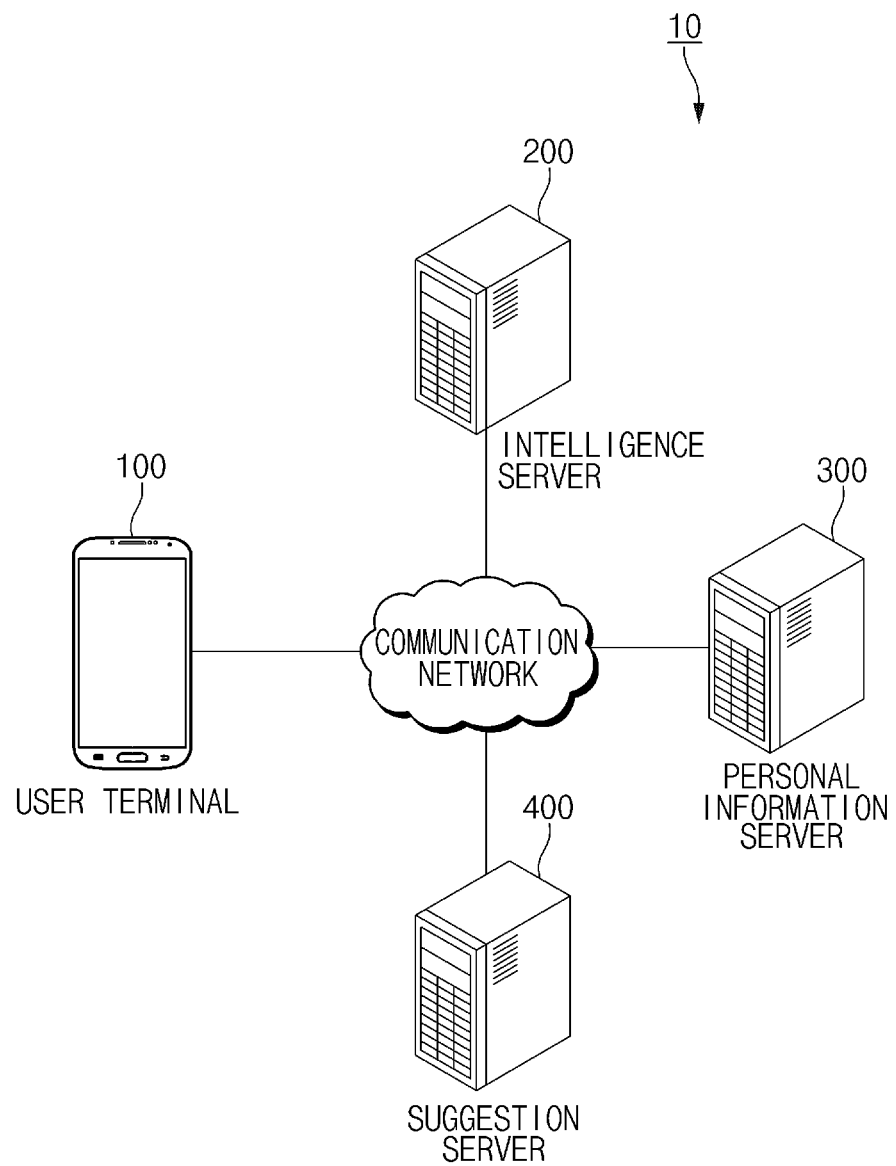
FIG. 1 is a view illustrating an integrated intelligent system, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

FIG. 1 is a view illustrating an integrated intelligent system, according to an embodiment.

Referring to FIG. 1, an integrated intelligent system 10 may include a user terminal 100, an intelligent server 200, a personalization information server 300, or a suggestion server 400.

The user terminal 100 may provide a service necessary for a user through an app (or an application program) (e.g., an alarm app, a message app, a picture (gallery) app, or the like) stored in the user terminal 100. The user terminal 100 may execute and operate other app through an intelligent app (or a speech recognition app) stored in the user terminal 100. A user input for launching and operating the other app through the intelligent app of the user terminal 100 may be received. The user input may be received through a physical button, a touch pad, a voice input, a remote input, or the like. Various types of terminal devices (or an electronic device), which are connected with Internet, such as a mobile phone, a smartphone, personal digital assistant (PDA), a notebook computer, and the like may correspond to the user terminal 100.

The user terminal 100 may receive user utterance as a user input. The user terminal 100 may receive the user utterance and may generate an instruction for operating an app based on the user utterance. As such, the user terminal 100 may operate the app by using the instruction.

The intelligent server 200 may receive a voice input of a user from the user terminal 100 over a communication network and may change the voice input to text data. The intelligent server 200 may generate (or select) a path rule based on the text data. The path rule may include information about an action (or an operation or a task) for performing the function of an app or information about a parameter necessary to perform the action. In addition, the path rule may include the order of the action of the app. The user terminal 100 may receive the path rule, may select an app depending on the path rule, and may execute an action included in the path rule in the selected app.

The user terminal 100 may execute the action and may display a screen corresponding to a state of the user terminal 100, which executes the action, in a display. The user terminal 100 may execute the action and may not display the result obtained by executing the action in the display. The user terminal 100 may execute a plurality of actions and may display only the result of a part of the plurality of actions in the display. The user terminal 100 may display only the result, which is obtained by executing the last action, in the display. The user terminal 100 may receive the user input to display the result obtained by executing the action in the display.

The personalization information server 300 may include a database in which user information is stored. The personalization information server 300 may receive the user information (e.g., context information, information about execution of an app, or the like) from the user terminal 100 and may store the user information in the database. The intelligent server 200 may receive the user information from the personalization information server 300 over the communication network and may use the user information when generating a path rule associated with the user input. The user terminal 100 may receive the user information from the personalization information server 300 over the communication network, and may use the user information as information for managing the database.

The suggestion server 400 may include a database storing information about a function in a terminal, introduction of an application, or a function to be provided. The suggestion server 400 may include a database associated with a function that a user utilizes by receiving the user information of the user terminal 100 from the personalization information server 300. The user terminal 100 may receive information about the function to be provided from the suggestion server 400 over the communication network and may provide the information to the user.

Figure 2:
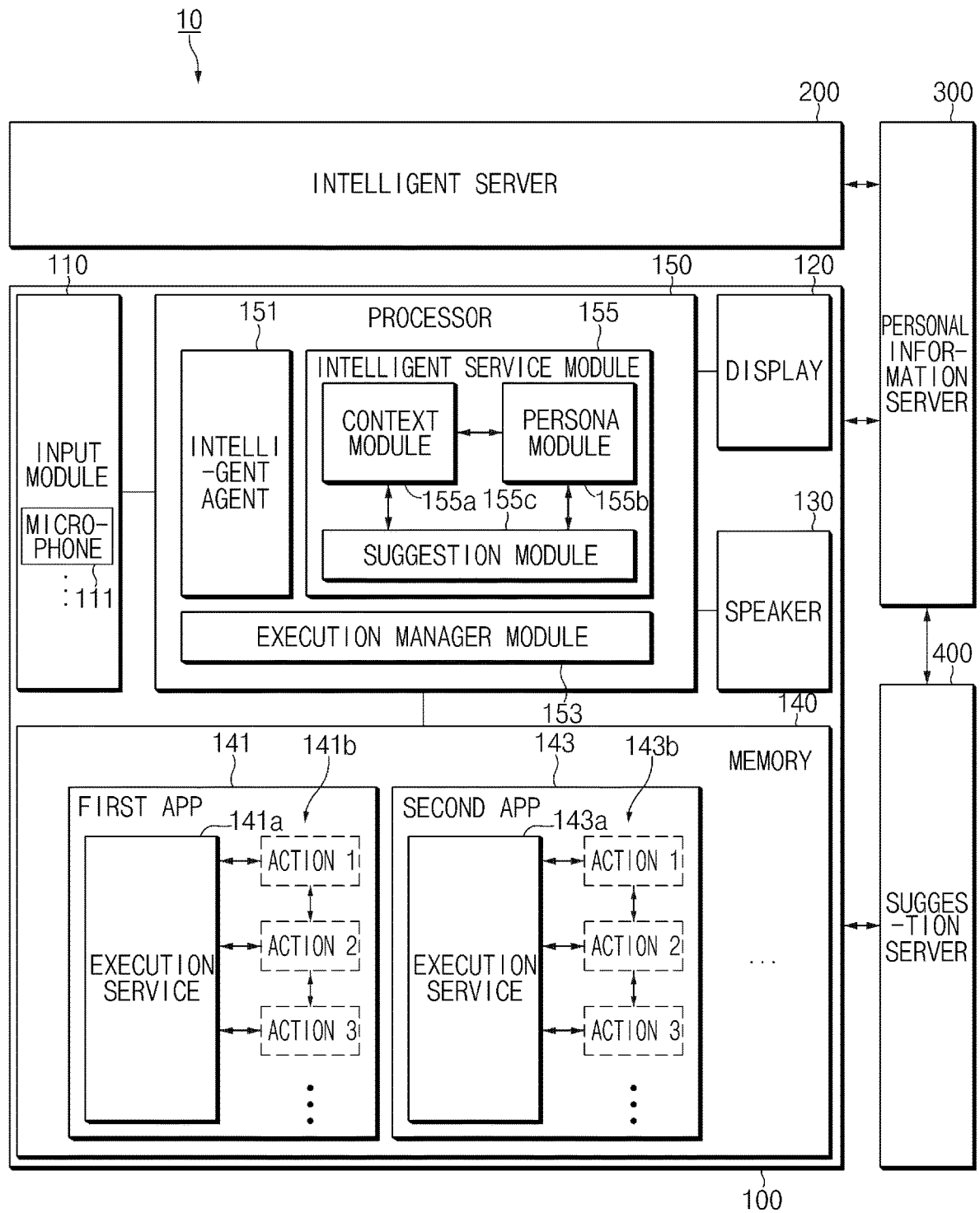
FIG. 2 is a diagram illustrating a user terminal of an integrated intelligent system, according to an embodiment.

FIG. 2 is a diagram illustrating a user terminal of an integrated intelligent system, according to an embodiment.

Referring to FIG. 2, the user terminal 100 may include an input module 110, a display 120, a speaker 130, a memory 140, or a processor 150. The user terminal 100 may further include housing, and elements of the user terminal 100 may be seated in the housing or may be positioned on the housing.

The input module 110 may receive a user input from a user. The input module 110 may receive the user input from the connected external device (e.g., a keyboard or a headset). The input module 110 may include a touch screen (e.g., a touch screen display) coupled to the display 120. The input module 110 may include a hardware key (or a physical key) placed in the user terminal 100 (or the housing of the user terminal 100).

The input module 110 may include a microphone 111 that is capable of receiving user utterance as a voice signal. The input module 110 may include a speech input system and may receive the utterance of the user as a voice signal through the speech input system.

The display 120 may display an image, a video, and/or an execution screen of an application. For example, the display 120 may display a graphic user interface (GUI) of an app.

The speaker 130 may output the voice signal. The speaker 130 may output the voice signal generated in the user terminal 100 to the outside.

The memory 140 may store a plurality of apps 141 and 143. The plurality of apps 141 and 143 stored in the memory 140 may be selected, launched, and executed depending on the user input.

The memory 140 may include a database capable of storing information necessary to recognize the user input. The memory 140 may include a log database capable of storing log information. The memory 140 may include a persona database capable of storing user information.

The memory 140 may store the plurality of apps 141 and 143, and the plurality of apps 141 and 143 may be loaded to operate. The plurality of apps 141 and 143 stored in the memory 140 may be loaded by an execution manager module 153 of the processor 150 to operate. The plurality of apps 141 and 143 may include execution services 141a and 143a performing a function or a plurality of actions (or unit actions) 141b and 143b. The execution services 141a and 143a may be generated by the execution manager module 153 of the processor 150 and then may execute the plurality of actions 141b and 143b.

When the actions 141b and 143b of the apps 141 and 143 are executed, an execution state screen according to the execution of the actions 141b and 143b may be displayed in the display 120. The execution state screen may be a screen in a state where the actions 141b and 143b are completed. The execution state screen may be a screen in a state where the execution of the actions 141b and 143b is in partial landing (e.g., in the case where a parameter necessary for the actions 141b and 143b are not input).

The execution services 141a and 143a may execute the actions 141b and 143b depending on a path rule. The execution services 141a and 143a may be activated by the execution manager module 153, may receive an execution request from the execution manager module 153 depending on the path rule, and may execute the actions 141b and 143b of the apps 141 and 143 depending on the execution request. When the execution of the actions 141b and 143b is completed, the execution services 141a and 143a may transmit completion information to the execution manager module 153.

When the plurality of the actions 141b and 143b are respectively executed in the apps 141 and 143, the plurality of the actions 141b and 143b may be sequentially executed. When the execution of one action (action 1) is completed, the execution services 141a and 143a may open the next action (action 2) and may transmit completion information to the execution manager module 153. Here, it is understood that opening an arbitrary action is to change a state of the arbitrary action to an executable state or to prepare the execution of the arbitrary action. In other words, when the arbitrary action is not opened, the corresponding action may be not executed. When the completion information is received, the execution manager module 153 may transmit an execution request for the next actions 141b and 143b to an execution service (e.g., action 2). When the plurality of apps 141 and 143 are executed, the plurality of apps 141 and 143 may be sequentially executed. When receiving the completion information after the execution of the last action of the first app 141 is executed, the execution manager module 153 may transmit the execution request of the first action of the second app 143 to the execution service 143a.

When the plurality of the actions 141b and 143b are executed in the apps 141 and 143, a result screen according to the execution of each of the executed plurality of the actions 141b and 143b may be displayed in the display 120. Only a part of a plurality of result screens according to the executed plurality of the actions 141b and 143b may be displayed in the display 120.

The memory 140 may store an intelligent app (e.g., a speech recognition app) operating in conjunction with an intelligent agent 151. The app operating in conjunction with the intelligent agent 151 may receive and process the utterance of the user as a voice signal. The app operating in conjunction with the intelligent agent 151 may be operated by a specific input (e.g., an input through a hardware key, an input through a touch screen, or a specific voice input) input through the input module 110.

The processor 150 may control overall actions of the user terminal 100. For example, the processor 150 may control the input module 110 to receive the user input. The processor 150 may control the display 120 to display an image. The processor 150 may control the speaker 130 to output the voice signal. The processor 150 may control the memory 140 to read or store necessary information.

The processor 150 may include the intelligent agent 151, the execution manager module 153, or an intelligent service module 155. The processor 150 may drive the intelligent agent 151, the execution manager module 153, or the intelligent service module 155 by executing instructions stored in the memory 140. Modules described in the disclosure may be implemented by hardware or by software. It is understood that the action executed by the intelligent agent 151, the execution manager module 153, or the intelligent service module 155 is an action executed by the processor 150.

The intelligent agent 151 may generate an instruction for operating an app based on the voice signal received as the user input. The execution manager module 153 may receive the generated instruction from the intelligent agent 151, and may select, launch, and operate the apps 141 and 143 stored in the memory 140. The intelligent service module 155 may manage information of the user and may use the information of the user to process the user input.

The intelligent agent 151 may transmit and process the user input received through the input module 110 to the intelligent server 200.

Before transmitting the user input to the intelligent server 200, the intelligent agent 151 may pre-process the user input. To pre-process the user input, the intelligent agent 151 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input to search for a part in which the user voice is present. The AGC module may adjust the volume of the user input so as to be suitable to recognize and process the user input. According to an embodiment, the intelligent agent 151 may include all the pre-processing elements for performance. However, the intelligent agent 151 may include a part of the pre-processing elements to operate at low power.

The intelligent agent 151 may include a wake up recognition module recognizing a call of a user. The wake up recognition module may recognize a wake up instruction of the user through the speech recognition module. When the wake up recognition module receives the wake up instruction, the wake up recognition module may activate the intelligent agent 151 to receive the user input. The wake up recognition module of the intelligent agent 151 may be implemented with a low-power processor (e.g., a processor included in an audio codec). The intelligent agent 151 may be activated depending on the user input entered through a hardware key. When the intelligent agent 151 is activated, an intelligent app (e.g., a speech recognition app) operating in conjunction with the intelligent agent 151 may be executed.

The intelligent agent 151 may include a speech recognition module for performing the user input. The speech recognition module may recognize the user input for executing an action in an app. The speech recognition module may recognize a limited user (voice) input (e.g., utterance such as "click" for executing a capturing action when a camera app is being executed) for executing an action such as the wake up instruction in the apps 141 and 143. The speech recognition module for recognizing a user input while assisting the intelligent server 200 may recognize and rapidly process a user instruction capable of being processed in the user terminal 100. The speech recognition module for executing the user input of the intelligent agent 151 may be implemented in an app processor.

The speech recognition module (including the speech recognition module of a wake up module) of the intelligent agent 151 may recognize the user input by using an algorithm for recognizing a voice. The algorithm for recognizing the voice may be at least one of a hidden Markov model (HMM) algorithm, an artificial neural network (ANN) algorithm, or a dynamic time warping (DTW) algorithm.

The intelligent agent 151 may change the voice input of the user to text data. The intelligent agent 151 may transmit the voice of the user to the intelligent server 200 to receive the changed text data. As such, the intelligent agent 151 may display the text data in the display 120.

The intelligent agent 151 may receive a path rule from the intelligent server 200. The intelligent agent 151 may transmit the path rule to the execution manager module 153.

The intelligent agent 151 may transmit the execution result log according to the path rule received from the intelligent server 200 to the intelligent service module 155, and the transmitted execution result log may be accumulated and managed in preference information of the user of a persona module 155b.

The execution manager module 153 may receive the path rule from the intelligent agent 151 to execute the apps 141 and 143 and may allow the apps 141 and 143 to execute the actions 141b and 143b included in the path rule. The execution manager module 153 may transmit instruction information for executing the actions 141b and 143b to the apps 141 and 143 and may receive completion information of the actions 141b and 143b from the apps 141 and 143.

The execution manager module 153 may transmit or receive the instruction information for executing the actions 141b and 143b of the apps 141 and 143 between the intelligent agent 151 and the apps 141 and 143. The execution manager module 153 may bind the apps 141 and 143 to be executed depending on the path rule and may transmit the instruction information of the actions 141b and 143b included in the path rule to the apps 141 and 143. The execution manager module 153 may sequentially transmit the actions 141b and 143b included in the path rule to the apps 141 and 143 and may sequentially execute the actions 141b and 143b of the apps 141 and 143 depending on the path rule.

The execution manager module 153 may manage execution states of the actions 141b and 143b of the apps 141 and 143. The execution manager module 153 may receive information about the execution states of the actions 141b and 143b from the apps 141 and 143. When the execution states of the actions 141b and 143b are in partial landing (e.g., in the case where a parameter necessary for the actions 141b and 143b are not input), the execution manager module 153 may transmit information about the partial landing to the intelligent agent 151. The intelligent agent 151 may make a request for an input of necessary information (e.g., parameter information) to the user by using the received information. When the execution state of the actions 141b and 143b are in an operating state, the utterance may be received from the user, and the execution manager module 153 may transmit information about the apps 141 and 143 being executed and the execution states of the apps 141 and 143 to the intelligent agent 151. The intelligent agent 151 may receive parameter information of the utterance of the user through the intelligent server 200 and may transmit the received parameter information to the execution manager module 153. The execution manager module 153 may change a parameter of each of the actions 141b and 143b to a new parameter by using the received parameter information.

The execution manager module 153 may transmit the parameter information included in the path rule to the apps 141 and 143. When the plurality of apps 141 and 143 are sequentially executed depending on the path rule, the execution manager module 153 may transmit the parameter information included in the path rule from one app to another app.

The execution manager module 153 may receive a plurality of path rules. The execution manager module 153 may select a plurality of path rules based on the utterance of the user. When the user utterance specifies the app 141 executing a part of the action 141b but does not specify the app 143 executing any other action 143b, the execution manager module 153 may receive a plurality of different path rules in which the same app 141 (e.g., an gallery app) executing the part of the action 141b is executed and in which different apps 143 (e.g., a message app or a Telegram app) executing the other action 143b. The execution manager module 153 may execute the same actions 141b and 143b (e.g., the same successive actions 141b and 143b) of the plurality of path rules. When the execution manager module 153 executes the same action, the execution manager module 153 may display a state screen for selecting the different apps 141 and 143 included in the plurality of path rules in the display 120.

The intelligent service module 155 may include a context module 155a, a persona module 155b, or a suggestion module 155c.

The context module 155a may collect current states of the apps 141 and 143 from the apps 141 and 143. The context module 155a may receive context information indicating the current states of the apps 141 and 143 to collect the current states of the apps 141 and 143.

The persona module 155b may manage personal information of the user utilizing the user terminal 100. The persona module 155b may collect the usage information and the execution result of the user terminal 100 to manage personal information of the user.

The suggestion module 155c may predict the intent of the user to recommend an instruction to the user. The suggestion module 155c may recommend an instruction to the user in consideration of the current state (e.g., a time, a place, context, or an app) of the user.

Figure 3:
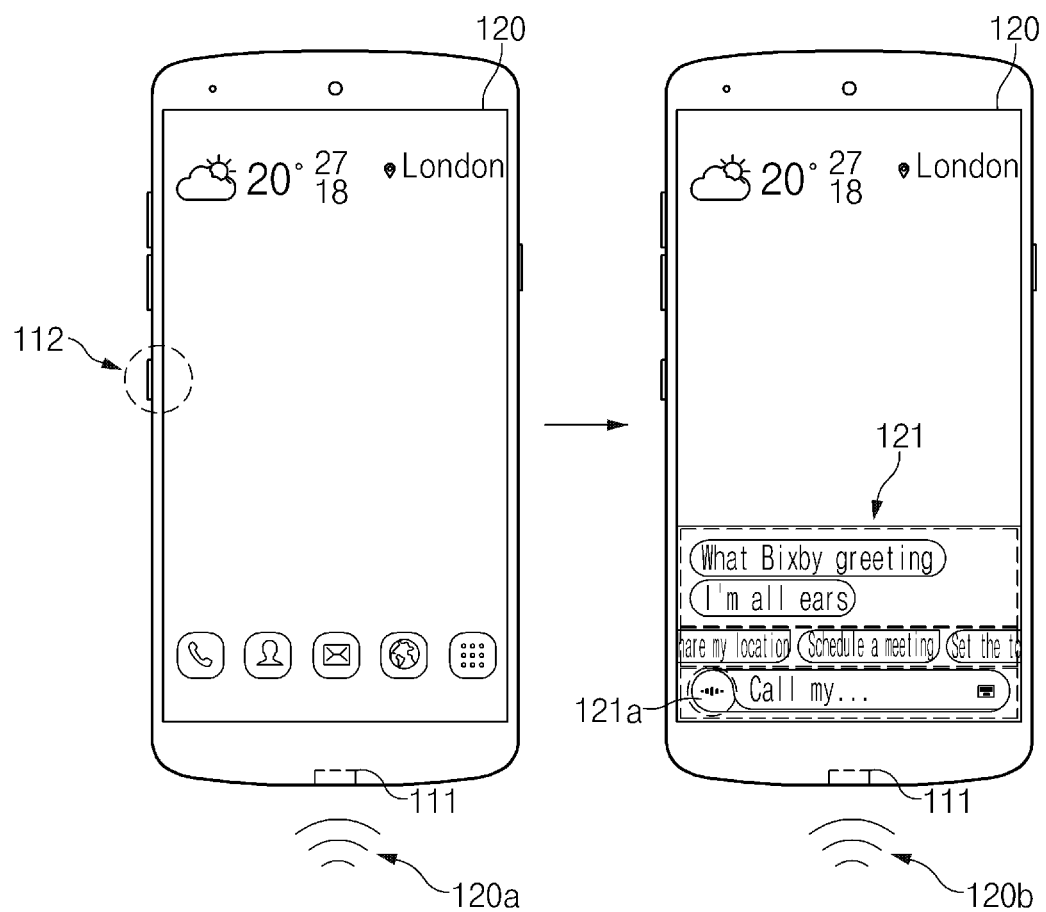
FIG. 3 is a view illustrating an intelligent app of a user terminal being executed, according to an embodiment.

FIG. 3 is of an intelligent app of a user terminal being executed, according to an embodiment.

FIG. 3 illustrates that the user terminal 100 receives a user input to execute an intelligent app (e.g., a speech recognition app) operating in conjunction with the intelligent agent 151.

The user terminal 100 may execute the intelligent app for recognizing a voice through a hardware key 112. When the user terminal 100 receives the user input through the hardware key 112, the user terminal 100 may display a UI 121 of the intelligent app in the display 120. A user may touch a speech recognition button 121a of the UI 121 of the intelligent app for the purpose of entering a voice 111b in a state where the UI 121 of the intelligent app is displayed in the display 120. While continuously pressing the hardware key 112 to enter the voice 111b, the user may enter the voice 111b.

The user terminal 100 may execute the intelligent app for recognizing a voice through the microphone 111. When a specified voice (e.g., "wake up!") is entered 111a through the microphone 111, the user terminal 100 may display the UI 121 of the intelligent app in the display 120.

Figure 4:
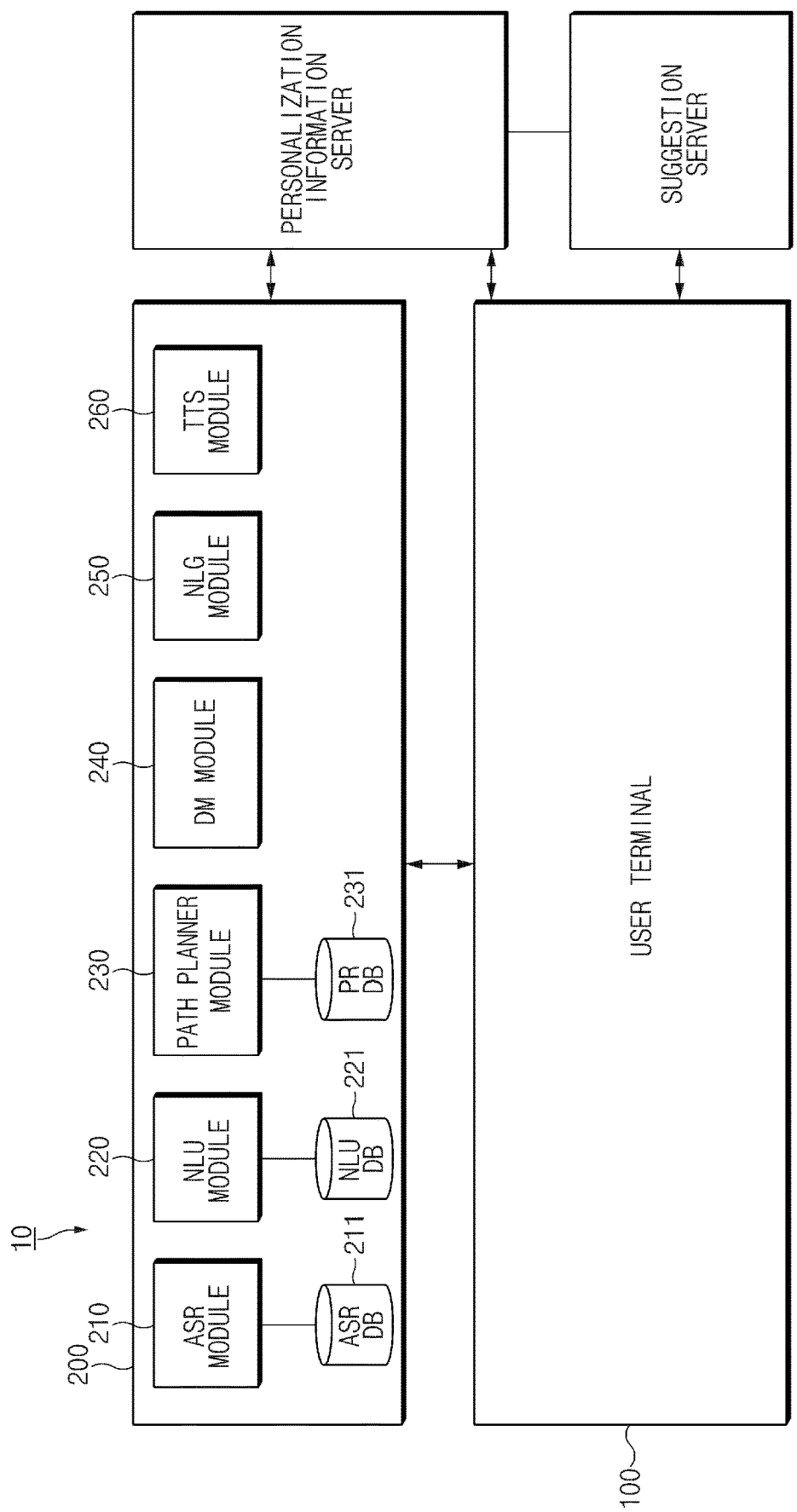
FIG. 4 is a diagram illustrating an intelligent server of an integrated intelligent system, according to an embodiment.

FIG. 4 is a diagram illustrating an intelligent server of an integrated intelligent system, according to an embodiment.

Referring to FIG. 4, the intelligent server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260.

The NLU module 220 or the path planner module 230 of the intelligent server 200 may generate a path rule.

The ASR module 210 may change the user input received from the user terminal 100 to text data.

The ASR module 210 may include an utterance recognition module. The utterance recognition module may include an acoustic model and a language model. The acoustic model may include information associated with utterance, and the language model may include unit phoneme information and information about a combination of unit phoneme information. The utterance recognition module may change user utterance to text data by using the information associated with utterance and unit phoneme information. The information about the acoustic model and the language model may be stored in an automatic speech recognition database (ASR DB) 211.

The NLU module 220 may grasp user intent by performing syntactic analysis or semantic analysis. The syntactic analysis may divide the user input into syntactic units (e.g., words, phrases, morphemes, and the like) and determine which syntactic elements the divided units have. The semantic analysis may be performed by using semantic matching, rule matching, formula matching, or the like. As such, the NLU module 220 may obtain a domain, intent, or a parameter (or a slot) necessary for the user input to express the intent.

The NLU module 220 may determine the intent of the user and parameter by using a matching rule that is divided into a domain, intent, and a parameter (or a slot) necessary to grasp the intent. The one domain (e.g., an alarm) may include a plurality of intent (e.g., alarm settings, alarm cancellation, and the like), and one intent may include a plurality of parameters (e.g., a time, the number of iterations, an alarm sound, and the like). The plurality of rules may include one or more necessary parameters. The matching rule may be stored in a natural language understanding database (NLU DB) 221.

The NLU module 220 may grasp the meaning of words extracted from a user input by using linguistic features (e.g., grammatical elements) such as morphemes, phrases, and the like and may match the meaning of the grasped words to the domain and intent to determine user intent. The NLU module 220 may calculate how many words extracted from the user input is included in each of the domain and the intent, for the purpose of determining the user intent. The NLU module 220 may determine a parameter of the user input by using the words that are the basis for grasping the intent. The NLU module 220 may determine the user intent by using the NLU DB 221 storing the linguistic features for grasping the intent of the user input. The NLU module 220 may determine the user intent by using a personal language model (PLM). The NLU module 220 may determine the user intent by using the personalized information (e.g., a contact list or a music list). The PLM may be stored in the NLU DB 221. The ASR module 210 as well as the NLU module 220 may recognize the voice of the user with reference to the PLM stored in the NLU DB 221.

The NLU module 220 may generate a path rule based on the intent of the user input and the parameter. The NLU module 220 may select an app to be executed, based on the intent of the user input and may determine an action to be executed, in the selected app. The NLU module 220 may determine the parameter corresponding to the determined action to generate the path rule. The path rule generated by the NLU module 220 may include information about the app to be executed, the action to be executed in the app, and a parameter necessary to execute the action.

The NLU module 220 may generate one path rule, or a plurality of path rules based on the intent of the user input and the parameter. The NLU module 220 may receive a path rule set corresponding to the user terminal 100 from the path planner module 230 and may map the intent of the user input and the parameter to the received path rule set for the purpose of determining the path rule.

The NLU module 220 may determine the app to be executed, the action to be executed in the app, and a parameter necessary to execute the action based on the intent of the user input and the parameter for the purpose of generating one path rule or a plurality of path rules. The NLU module 220 may arrange the app to be executed and the action to be executed in the app by using information of the user terminal 100 depending on the intent of the user input in the form of ontology or a graph model for the purpose of generating the path rule. The generated path rule may be stored in a path rule database (PR DB) 231 through the path planner module 230. The generated path rule may be added to a path rule set of the PR DB 231.

The NLU module 220 may select at least one path rule of the generated plurality of path rules. The NLU module 220 may select an optimal path rule of the plurality of path rules. When only a part of action is specified based on the user utterance, the NLU module 220 may select a plurality of path rules. The NLU module 220 may determine one path rule of the plurality of path rules depending on an additional input of the user.

The NLU module 220 may transmit the path rule to the user terminal 100 in response to a request for the user input. The NLU module 220 may transmit one path rule corresponding to the user input to the user terminal 100. The NLU module 220 may transmit the plurality of path rules corresponding to the user input to the user terminal 100. When only a part of action is specified based on the user utterance, the plurality of path rules may be generated by the NLU module 220.

The path planner module 230 may select at least one path rule of the plurality of path rules.

The path planner module 230 may transmit a path rule set including the plurality of path rules to the NLU module 220. The plurality of path rules of the path rule set may be stored in the PR DB 231 connected to the path planner module 230 in the table form. The path planner module 230 may transmit a path rule set corresponding to information (e.g., OS information or app information) of the user terminal 100, which is received from the intelligent agent 151, to the NLU module 220. A table stored in the PR DB 231 may be stored for each domain or for each version of the domain.

The path planner module 230 may select one path rule or the plurality of path rules from the path rule set to transmit the selected one path rule or the selected plurality of path rules to the NLU module 220. The path planner module 230 may match the user intent and the parameter to the path rule set corresponding to the user terminal 100 to select one path rule or a plurality of path rules and may transmit the selected one path rule or the selected plurality of path rules to the NLU module 220.

The path planner module 230 may generate the one path rule or the plurality of path rules by using the user intent and the parameter. The path planner module 230 may determine the app to be executed and the action to be executed in the app based on the user intent and the parameter for the purpose of generating the one path rule or the plurality of path rules. The path planner module 230 may store the generated path rule in the PR DB 231.

The path planner module 230 may store the path rule generated by the NLU module 220 in the PR DB 231. The generated path rule may be added to the path rule set stored in the PR DB 231.

The table stored in the PR DB 231 may include a plurality of path rules or a plurality of path rule sets. The plurality of path rules or the plurality of path rule sets may reflect the kind, version, type, or characteristic of a device performing each path rule.

The DM module 240 may determine whether the user intent grasped by the NLU module 220 is clear. The DM module 240 may determine whether the user intent is clear, based on whether the information of a parameter is sufficient. The DM module 240 may determine whether the parameter grasped by the NLU module 220 is sufficient to perform a task. When the user intent is not clear, the DM module 240 may perform a feedback for making a request for necessary information to the user. The DM module 240 may perform a feedback for making a request for information about the parameter for grasping the user intent.

The DM module 240 may include a content provider module. When the content provider module executes an action based on the intent and the parameter grasped by the NLU module 220, the content provider module may generate the result obtained by performing a task corresponding to the user input. The DM module 240 may transmit the result generated by the content provider module as the response to the user input to the user terminal 100.

The natural language generating module NLG 250 may change specified information to a text form. Information changed to the text form may be a form of a natural language utterance. The specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

The TTS module 260 may change information of the text form to information of a voice form. The TTS module 260 may receive the information of the text form from the NLG module 250, may change the information of the text form to the information of a voice form, and may transmit the information of the voice form to the user terminal 100. The user terminal 100 may output the information of the voice form to the speaker 130.

The NLU module 220, the path planner module 230, and the DM module 240 may be implemented with one module. The NLU module 220, the path planner module 230 and the DM module 240 may be implemented with one module, may determine the user intent and the parameter, and may generate a response (e.g., a path rule) corresponding to the determined user intent and parameter. As such, the generated response may be transmitted to the user terminal 100.

Figure 5:
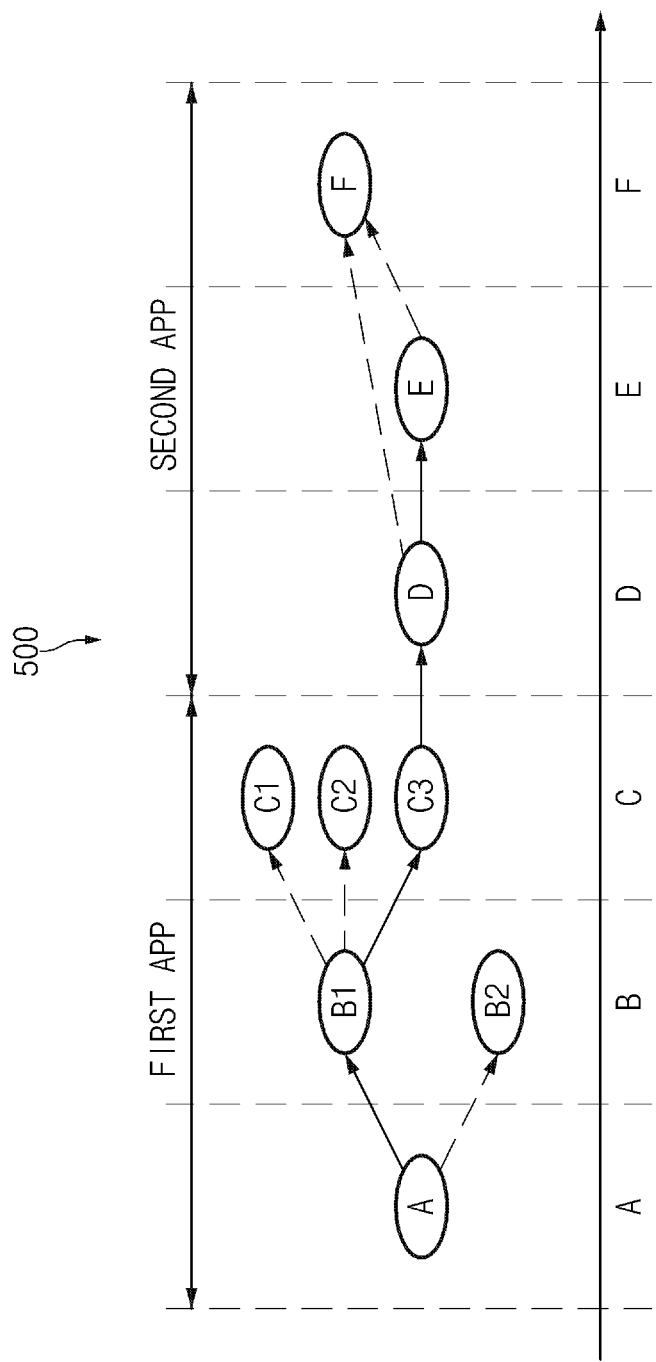
FIG. 5 is a view illustrating a path rule generating method of a natural language understanding (NLU) module, according to an embodiment.

FIG. 5 is a diagram illustrating a path rule generating method of an NLU module, according to an embodiment.

Referring to FIG. 5, the NLU module 220 may divide the function of an app into unit actions (e.g., A to F) and may store the divided unit actions in the PR DB 231. The NLU module 220 may store a path rule set, which includes a plurality of path rules A-B1-C1, A-B1-C2, A-B1-C3-D-F, and A-B1-C3-D-E-F divided into unit actions, in the PR DB 231.

The PR DB 231 of the path planner module 230 may store the path rule set for performing the function of an app. The path rule set may include a plurality of path rules each of which includes a plurality of actions. An action executed depending on a parameter input to each of the plurality of actions may be sequentially arranged in the plurality of path rules. The plurality of path rules implemented in a form of ontology or a graph model may be stored in the PR DB 231.

The NLU module 220 may select an optimal path rule A-B1-C3-D-F of the plurality of path rules A-B1-C1, A-B1-C2, A-B1-C3-D-F, and A-B1-C3-D-E-F corresponding to the intent of a user input and the parameter.

When there is no path rule completely matched to the user input, the NLU module 220 may transmit a plurality of rules to the user terminal 100. The NLU module 220 may select a path rule (e.g., A-B1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may transmit the one or more path rules to the user terminal 100.

The NLU module 220 may select one of a plurality of path rules based on an input added by the user terminal 100 and may transmit the selected one path rule to the user terminal 100. The NLU module 220 may select one path rule (e.g., A-B1-C3-D-F) of the plurality of path rules (e.g., A-B1-C1, A-B1-C2, A-B1-C3-D-F, and A-B1-C3-D-E-F) depending on the user input (e.g., an input for selecting C3) additionally entered by the user terminal 100 for the purpose of transmitting the selected one path rule to the user terminal 100.

The NLU module 220 may determine the intent of a user and the parameter corresponding to the user input (e.g., an input for selecting C3) additionally entered by the user terminal 100 for the purpose of transmitting the user intent or the parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

As such, the user terminal 100 may complete the actions of the apps 141 and 143 based on the selected one path rule.

When a user input in which information is insufficient is received by the intelligent server 200, the NLU module 220 may generate a path rule partly corresponding to the received user input. The NLU module 220 may transmit the partly corresponding path rule to the intelligent agent 151. The intelligent agent 151 may transmit the partly corresponding path rule to the execution manager module 153, and the execution manager module 153 may execute the first app 141 depending on the path rule. The execution manager module 153 may transmit information about an insufficient parameter to the intelligent agent 151 while executing the first app 141. The intelligent agent 151 may make a request for an additional input to a user by using the information about the insufficient parameter. When the additional input is received by the user, the intelligent agent 151 may transmit and process the additional input to the intelligent server 200. The NLU module 220 may generate a path rule to be added, based on the intent of the user input additionally entered and parameter information and may transmit the path rule to be added, to the intelligent agent 151. The intelligent agent 151 may transmit the path rule to the execution manager module 153 and may execute the second app 143.

When a user input, in which a portion of information is missed, is received by the intelligent server 200, the NLU module 220 may transmit a user information request to the personalization information server 300. The personalization information server 300 may transmit information of a user entering the user input stored in a persona database to the NLU module 220. The NLU module 220 may select a path rule corresponding to the user input in which a part of an action is missed, by using the user information. As such, even though the user input in which a portion of information is missed is received by the intelligent server 200, the NLU module 220 may make a request for the missed information to receive an additional input or may determine a path rule corresponding to the user input by using user information.

Figure 6:
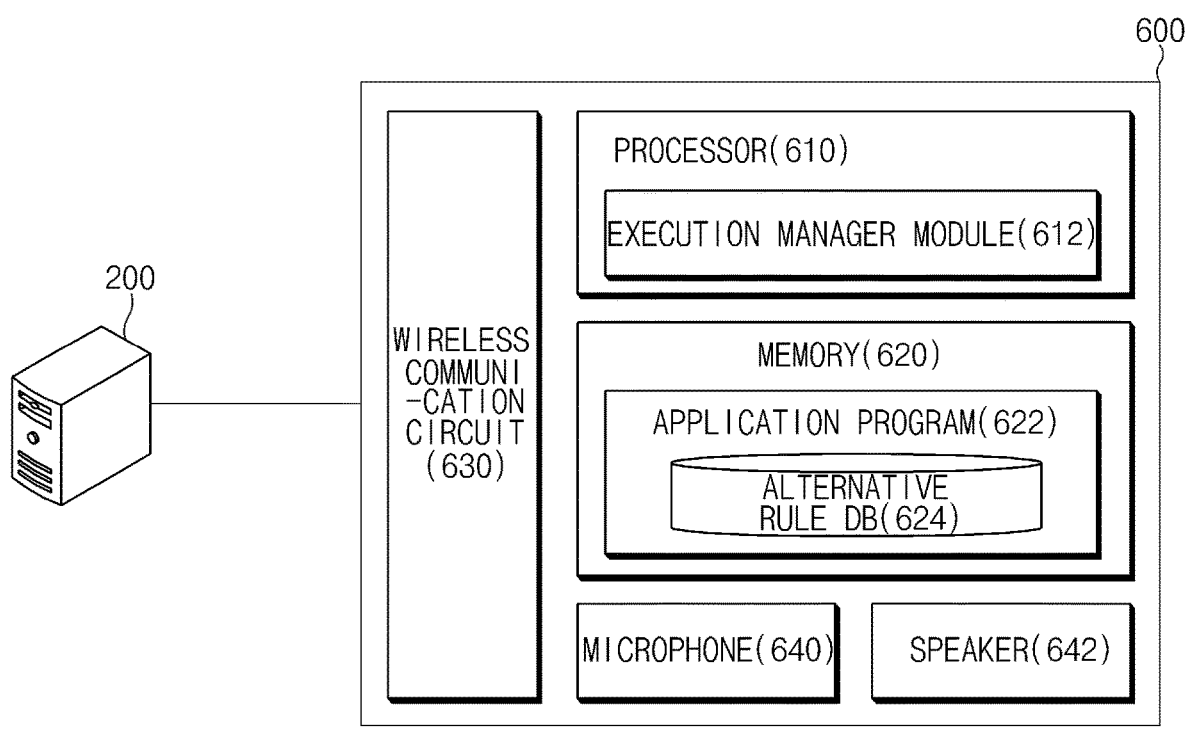
FIG. 6 is a diagram illustrating an electronic device, according to an embodiment.

FIG. 6 is a diagram illustrating an electronic device, according to an embodiment.

An electronic device 600 may include a processor 610, a memory 620, a wireless communication circuit 630, a microphone 640, and a speaker 642. The electronic device 600 may include housing. The microphone 640 and the speaker 642 may be positioned at different portions of the housing.

The processor 610 may control overall operations of the electronic device 600. It is understood that the operation of the electronic device 600 is performed by the processor 610. The processor 610 may be electrically connected to the memory 620, the wireless communication circuit 630, the microphone 640, and the speaker 642. The processor 610 may include a plurality of processors such as an application processor, a communication processor, and the like.

The memory 620 may store an application program 622. The application program 622 may support a specific task. The memory 620 may include a database storing path rules for performing the specific task, that is, an alternative rule database 624. Each path rule may include states of the electronic device 600. The electronic device 600 may perform a specific task by performing the states.

The memory 620 may store a plurality of application programs. The plurality of application programs may include plug-ins of different application programs. When the first application program is executed, the second application program may be executed through a plug-in installed in the first application program. In this case, the first application program and the second application program may be programs associated with each other. For example, the plug-in may be provided from the second application program or a server operating the second application. The electronic device 600 may download the plug-in and may install the plug-in on the first application program. When the first application program is executed, the electronic device 600 may execute the second application program through the plug-in without any additional input (e.g., an icon execution input) for executing the second application program.

States included in the path rule may include states capable of being executed on one application program. The first task capable of being performed by the first application program may be performed by the function included in the first application program itself. Alternatively, the first task may be performed by the function included in the second application program operated via the plug-in installed in the first application program. The states included in the path rule may include states of the electronic device 600 that allow functions operated via the plug-in to be executed.

The electronic device 600 may perform communication with an external server (e.g., the intelligent server 200) via the wireless communication circuit 630. The communication circuit may be attached to the housing of the electronic device 600 or may be positioned inside the housing.

The processor 610 of the electronic device 600 may obtain the utterance of a user, using the microphone 640. The utterance may be referred to as a "voice command". The electronic device 600 may transmit the user's utterance to the intelligent server 200 via the wireless communication circuit 630.

The processor 610 may include an execution manager module 612. The processor 610 may execute the instructions stored in the memory 620 to drive the execution manager module 612. Modules described in the disclosure may be implemented by hardware or by software. It is understood that the operation executed by the execution manager module 612 is the operation executed by the processor 610.

The execution manager module 612 may receive a path rule corresponding to the utterance of the user from the intelligent server 200. The path rule may be referred to as a set of instructions for performing the task requested via the user's utterance. The execution manager module 612 may execute the path rule on the application program 622 that supports the task corresponding to the path rule. When an error occurs during the execution of the path rule, the execution manager module 612 may search for the alternative path rule of the path rule, from the alternative rule database 624 in the application program 622. The execution manager module 612 may complete the task (e.g., the specific function of the electronic device 600) requested by the voice command of the user by performing the found alternative path rule. The execution manager module 612 may transmit performance information (e.g., whether the execution is completed) about the task to the intelligent server 200.

Figure 7:
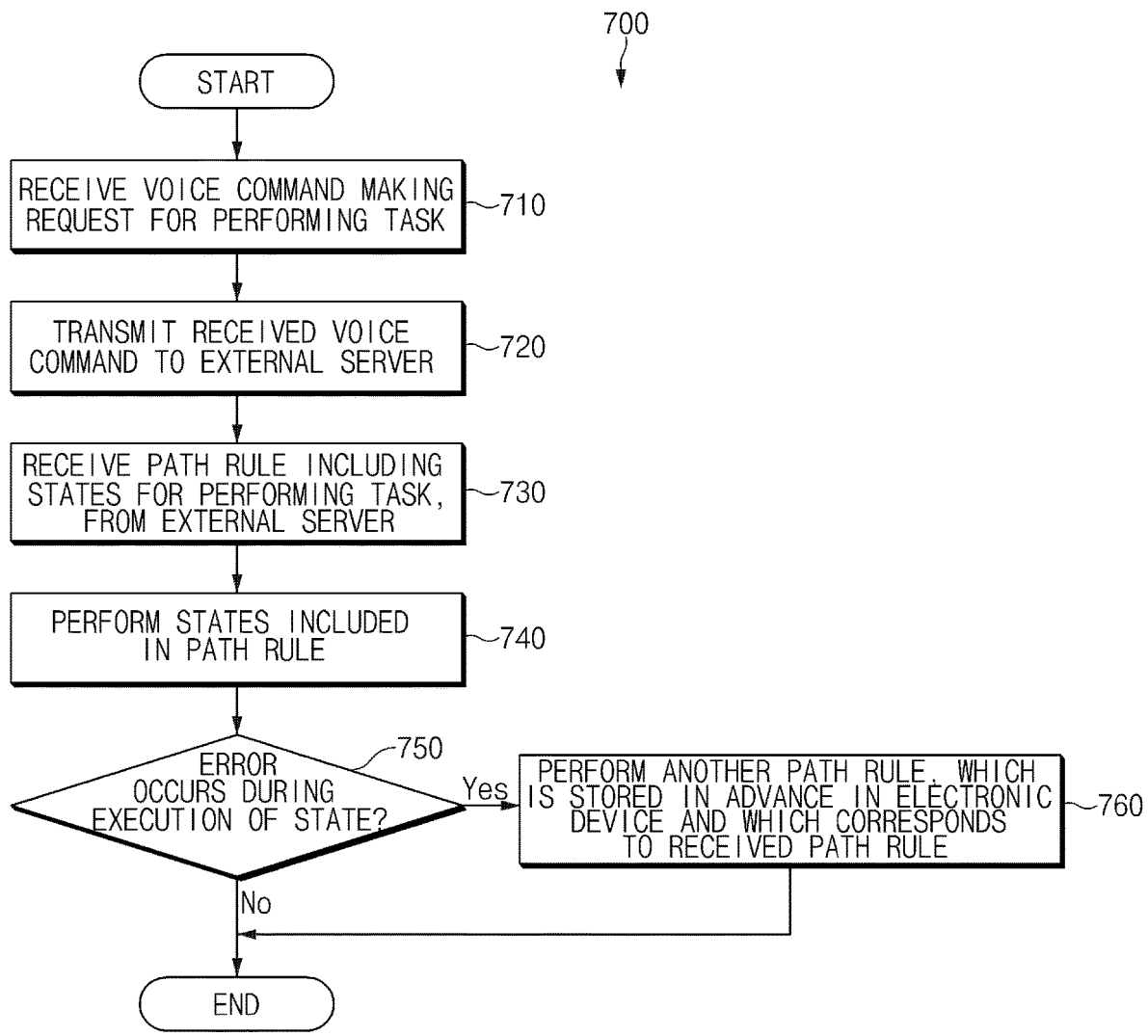
FIG. 7 is a flowchart of a method of performing an alternative path rule, according to an embodiment.
Figure 8B:
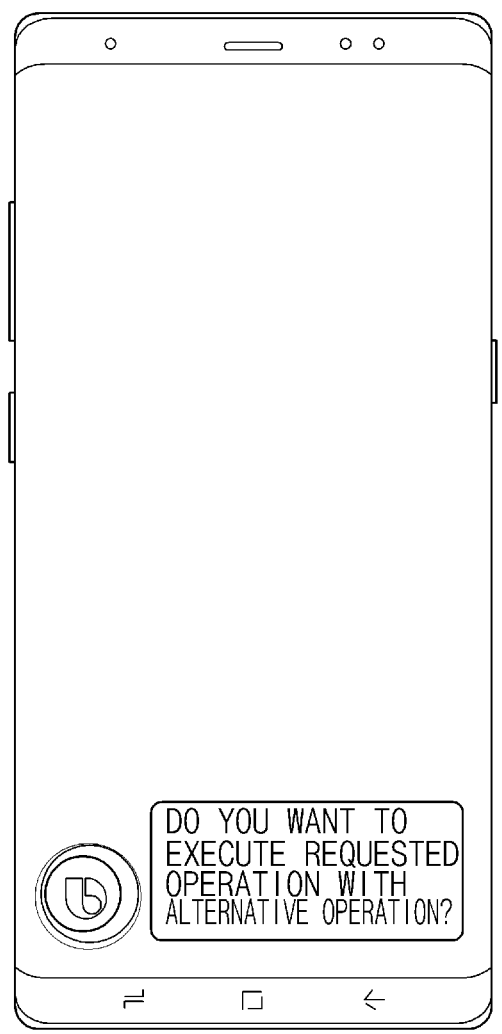
FIG. 8B is a diagram of an interface for making a request for consent of a user, according to an embodiment.

FIG. 7 is a flowchart of a method of performing an alternative path rule, according to an embodiment. FIG. 8A is a diagram of table data, according to an embodiment. FIG. 8B is a diagram of an interface for making a request for consent of a user, according to an embodiment.

Referring to FIG. 7, a flowchart 700 illustrating a method for performing an alternative path rule is illustrated. The flowchart 700 may include step 710 to step 760. Step 710 to Step 760 may be performed by, the electronic device 600 illustrated in FIG. 6. Step 710 to Step 760 may be respectively implemented with, instructions capable of being performed (or executed) by the processor 610 of the electronic device 600. The instructions may be stored in a computer-readable recording medium or the memory 620 of the electronic device 600 illustrated in FIG. 6. Hereinafter, the description about step 710 to step 760 is the same as the description given with reference to FIG. 6 may not be repeated here and the reference numerals of FIG. 6 may be cited in the descriptions about step 710 to step 760.

At step 710, the electronic device 600 may receive a voice command making a request for performing a specific task of the application program 622, via the microphone 640.

At step 720, the electronic device 600 may transmit the received voice command to the intelligent server 200 via the wireless communication circuit 630.

At step 730, the electronic device 600 may receive a path rule including a plurality of states of the electronic device 600 for performing the task, from the intelligent server 200 via the wireless communication circuit 630. At step 740, the electronic device 600 may perform a plurality of states included in the path rule, in response to the reception of the path rule.

At step 750, the electronic device 600 may detect whether an error (or a non-executable event) occurs during the execution of the plurality of states. When an error does not occur, the electronic device 600 may complete the execution of the received path rule.

The memory 620 of the electronic device 600 may store a plurality of path rules for performing the same function. The plurality of path rules may be mapped to one another so as to be stored in the memory 620.

The alternative rule database 624 may store table data 810 illustrated in FIG. 8A. Each of the path rules may have a path rule ID. The alternative rule database 624 may include a pair ID corresponding to each path rule ID. The pair ID may be referred to as a category corresponding to the function of the path rule. The path rule having the same pair ID may perform the same function. Path rules that perform the same function in this manner may be mapped to one another and may be stored.

At step 760, the electronic device 600 may perform another path rule, which is stored in advance in the electronic device 600 and which corresponds to the received path rule.

The electronic device 600 may search for another path rule corresponding to the received path rule, in the alternative rule database 624. The electronic device 600 may search for another path rule, which is mapped to the received path rule and is stored. The electronic device 600 may perform the found path rule as the alternative path rule.

The alternative rule database 624 may be updated by the administrator of the application program 622 in real time or periodically. When the new function is added to the application program 622, the electronic device 600 may provide the function via a database inside the electronic device 600 even though the electronic device 600 does not synchronize the function with the intelligent server 200 outside the electronic device 600.

The electronic device 600 may complete the execution of the alternative path rule and may transmit a completion message for the voice command at step 710, to the intelligent server 200. The electronic device 600 may transmit a completion message for the path rule transmitted by the intelligent server 200 at step 730. Because the alternative rule is executed by the electronic device 600 which is a user terminal, the electronic device 600 may allow the intelligent server 200 to be notified that the execution of the path rule is completed by transmitting a completion message for the first received path rule.

The electronic device 600 may manage a plurality of path rules that perform the same function, as one abstracted path rule (hereinafter referred to as an "abstract rule"). When the execution of the path rule or the alternative path rule is completed, the electronic device 600 may perform the execution completion process for the abstract rule. The electronic device 600 may transmit the execution completion message for the abstract rule, to the intelligent server 200. The electronic device 600 may perform at least part of a plurality of states included in the alternative path rule. The received path rule and alternative path rule may include the common states. When the common states are already executed by performing the path rule received by the electronic device 600, the electronic device 600 may execute the remaining states other than the common states among states included in the alternative path rule.

The electronic device 600 may provide an interface for obtaining an approval input for the execution of the alternative path rule, before executing the alternative path rule. The electronic device 600 may provide the interface to a user before performing step 760. The electronic device 600 may execute at least part of a plurality of states included in the alternative path rule, in response to the approval input obtained based on the interface. When the electronic device 600 obtains a rejection input for the interface, the electronic device 600 may transmit a failure message to the intelligent server 200 without executing the alternative path rule.

Referring to FIG. 8B, the electronic device 600 may display an interface 820 via, for example, a display. The electronic device 600 may obtain an approval input for an alternative operation via the interface 820.

The electronic device 600 may output a voice message for obtaining an approval input for the execution of an alternative path rule, via the speaker 642. The electronic device 600 may perform at least part of a plurality of states included in the alternative path rule, based on the approval input received in response to the output of the voice message.

Figure 9:
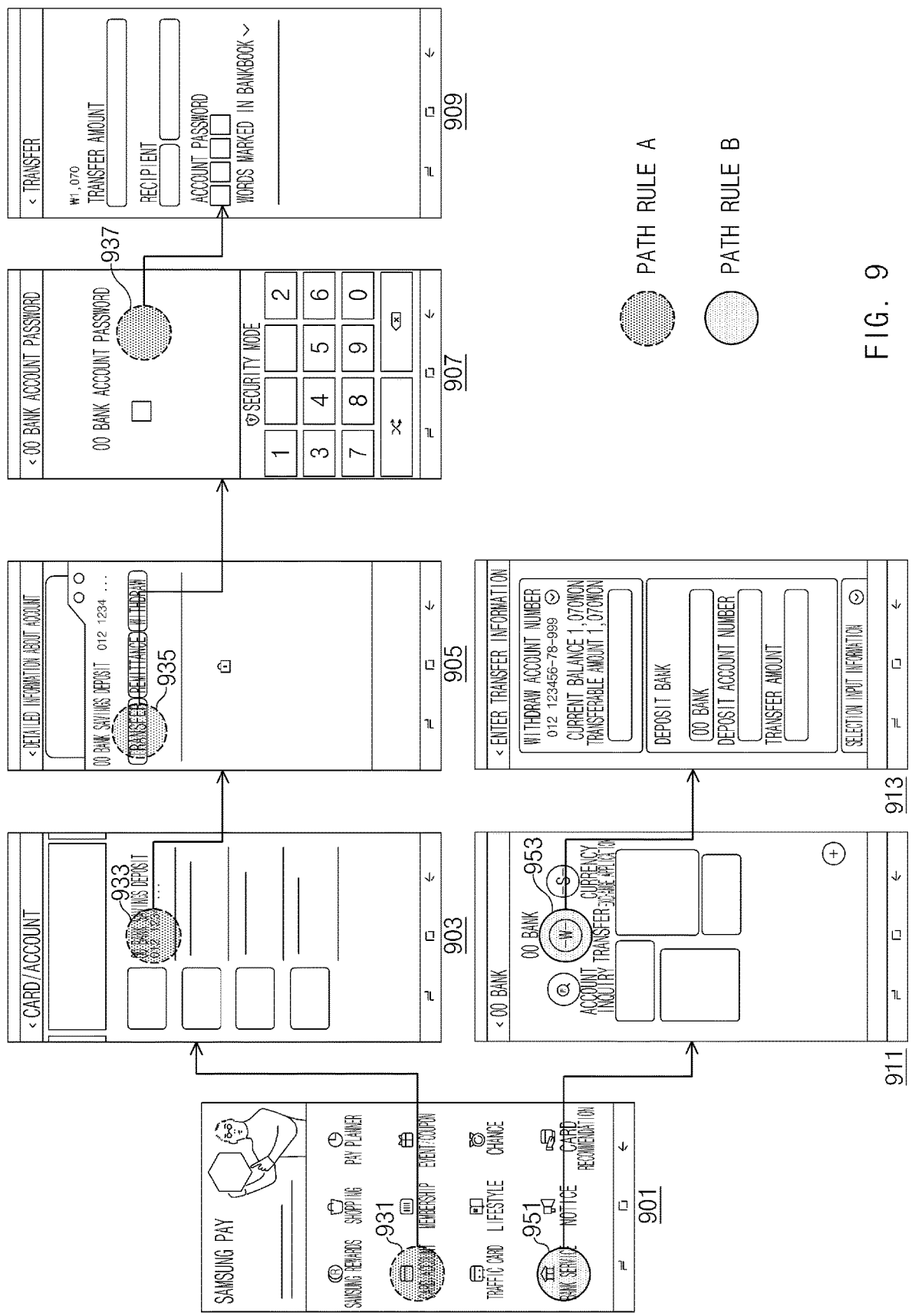
FIG. 9 is a diagram of one scenario for describing an operation to perform an alternative path rule of an electronic device, according to an embodiment.

FIG. 9 is a diagram one scenario for describing an operation to perform an alternative path rule of an electronic device, according to an embodiment.

A path rule may include states executed by the plug-in of an application program different from the application program 622 in which the path rule is performed. The path rule received from the intelligent server 200 may include a state executed by the plug-in. When the plug-in is not installed on the application program 622, an error may occur when the received path rule is executed. Hereinafter, an example of a scenario in which a remittance process is performed on a financial application (e.g., bank, pay) is described.

Referring to FIG. 9, a scenario in which a remittance function is executed on the payment application (e.g., Samsung Pay or Google Pay) is illustrated. A user may utter a voice command such as "remit 10,000 won". The function matched to the intent of a user may be referred to as (or matched to) remittance function. Referring to FIG. 9, each of screen 901 to screen 913 may be a screen displayed by the payment application. The payment application may store path rule A and path rule B for performing the remittance function in the electronic device 600 in advance. Path rule A and path rule B may be mapped to each other and may be stored in the alternative rule database 624.

"Path rule A" may include displaying a home screen 901 of a payment application (state a-1), selecting a card/account on the home screen 901 (state a-2), selecting a payment means on the screen 903 for displaying the payment means (state a-3), selecting a transfer function on a function selection screen 905 for the selected payment means (state a-4), entering a password on a password input screen 907 (state a-5), and displaying a transfer start screen 909 (state a-6), as a plurality of states.

"Path rule B" may include displaying the home screen 901 of the payment application (state b-1), selecting a plug-in bank service on the home screen 901 (state b-2), displaying the selected bank application home screen 911 (state b-3), selecting a transfer on the screen 911 (state b-4), and displaying a transfer screen 913 of a bank application (state b-5), as a plurality of states. State b-3, state b-4, and state b-5 may be referred to as functions of another bank application driven via a plug-in.

The electronic device 600 may receive the "path rule B" from the intelligent server 200 in response to the voice command saying "remit 10,000 won" (or $10,000). The electronic device 600 may attempt to execute state b-1 to state b-5 of path rule B. In particular, state b-3 to state b-5 may be executed by the plug-in of another bank application. When the corresponding plug-in is not installed in the payment application of the electronic device 600, an error may occur during the execution of path rule B.

The electronic device 600 may execute path rule A that performs a "remittance function" the same as the path rule B, in response to the occurrence of an error. At this time, because state a-1 of path rule A has already been executed, the electronic device 600 may execute state a-2 to state a-6.

The electronic device 600 may obtain various pieces of state information associated with a path rule from an external state check server. The electronic device 600 may determine whether to execute an alternative path rule, based on the obtained state information.

A specific path rule may require a subscription for a specific service, and the state check server may provide the subscription status of the service as information. The specific path rule may require installation of a plug-in provided by another application. The state check server may provide whether the plug-in is installed, as state information.

The electronic device 600 may obtain information about plug-in installation on the payment application. Before executing path rule B, the electronic device 600 may determine that it is impossible to execute path rule B, based on the plug-in installation information, and may execute an alternative path rule.

Figure 10:
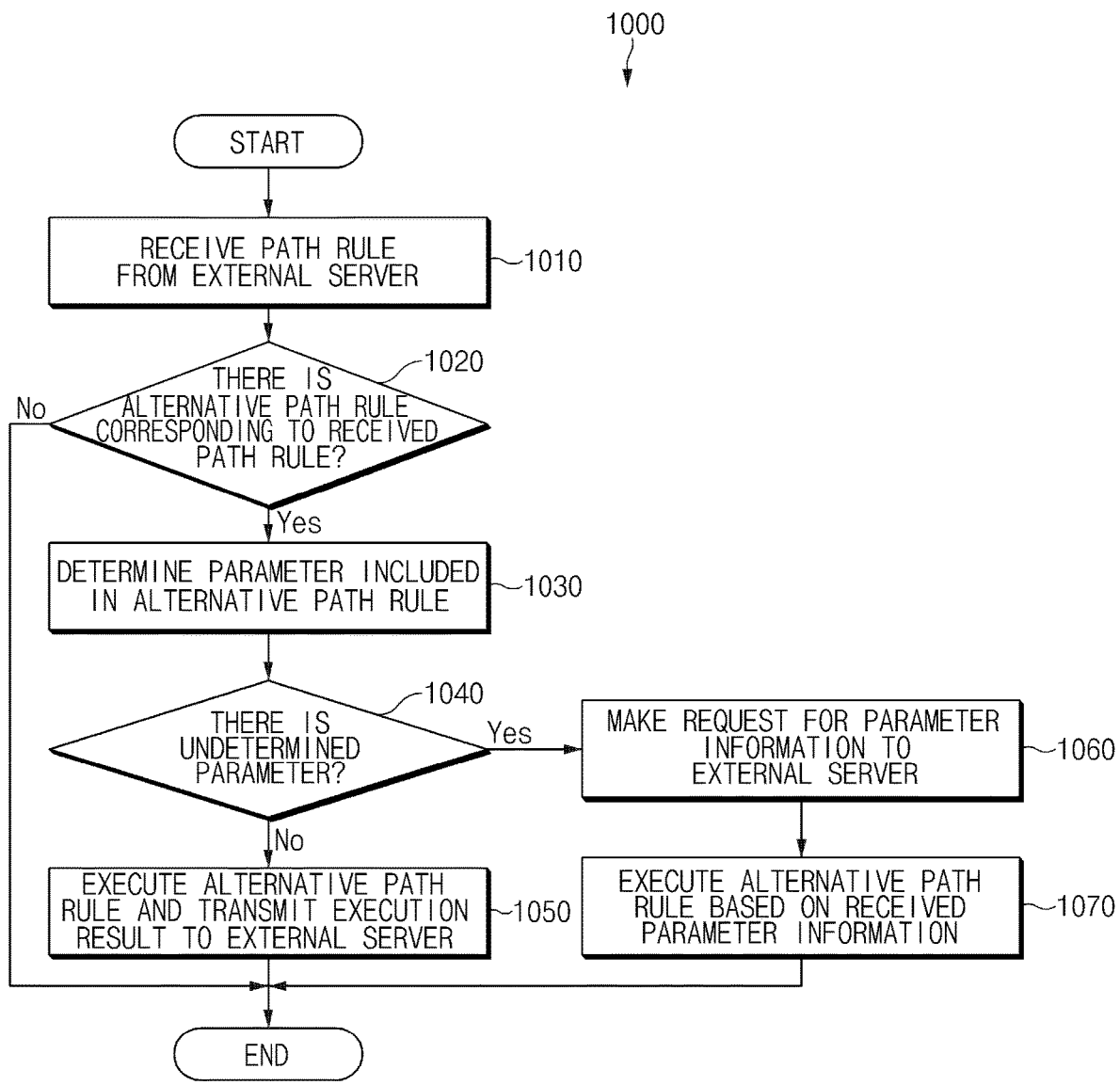
FIG. 10 is a flowchart of a method for determining a parameter of an alternative path rule, according to an embodiment.

FIG. 10 is a flowchart of a method for determining a parameter of an alternative path rule, according to an embodiment.

Referring to FIG. 10, a flowchart 1000 illustrating a method for determining a parameter of an alternative path rule is illustrated. The flowchart 1000 may include step 1010 to step 1070. Step 1010 to step 1070 may be performed by the electronic device 600 illustrated in FIG. 6.

At least part of the states included in the path rule may include at least one parameter. The intelligent server 200 may determine the value of a parameter and may transmit the states including the parameter value, to the electronic device 600. At step 1010, the electronic device 600 may receive a path rule including states, in each of which the parameter is determined, from the intelligent server 200. Step 1010 may correspond to step 730 of FIG. 7.

At step 1020, when it is impossible to execute the received path rule, the electronic device 600 may determine whether there is an alternative path rule corresponding to the received path rule. The electronic device 600 may search for the alternative rule database 624. When there is no found alternative rule, the electronic device 600 may terminate the execution of the path rule. The electronic device 600 may transmit an execution failure message of the path rule to the intelligent server 200.

At step 1030, the electronic device 600 may determine at least one parameter included in the alternative path rule. The electronic device 600 may determine the parameter included in the alternative path rule, based on the parameter included in the path rule received from the intelligent server 200.

Referring to table data 810 of FIG. 8A, the parameter area may include information about which parameter of the corresponding path rule match the parameter the specific path rule. The electronic device 600 may determine a parameter of the alternative path rule, using corresponding parameter information between pre-stored path rules corresponding to each other.

At step 1040, the electronic device 600 may determine whether there is an undetermined parameter. When all the parameters are determined, at step 1050, the electronic device 600 may execute an alternative path rule and may transmit the execution result to the intelligent server 200.

When all the parameters are not determined, at step 1060, the electronic device 600 may make a request for parameter information to the intelligent server 200. At step 1070, the electronic device 600 may execute the alternative path rule based on parameter information received from the intelligent server 200. The electronic device 600 may receive information about a parameter, which is not determined based on the parameters included in the received path rule, from among the at least one parameter included in the alternative path rule, from the intelligent server 200.

Referring to the table data 810 of FIG. 8A, when the path rule, in which a server request field is "yes" is selected as an alternative path rule, the electronic device 600 may make a request for information to the intelligent server 200 to execute the alternative path rule.

Figure 11:
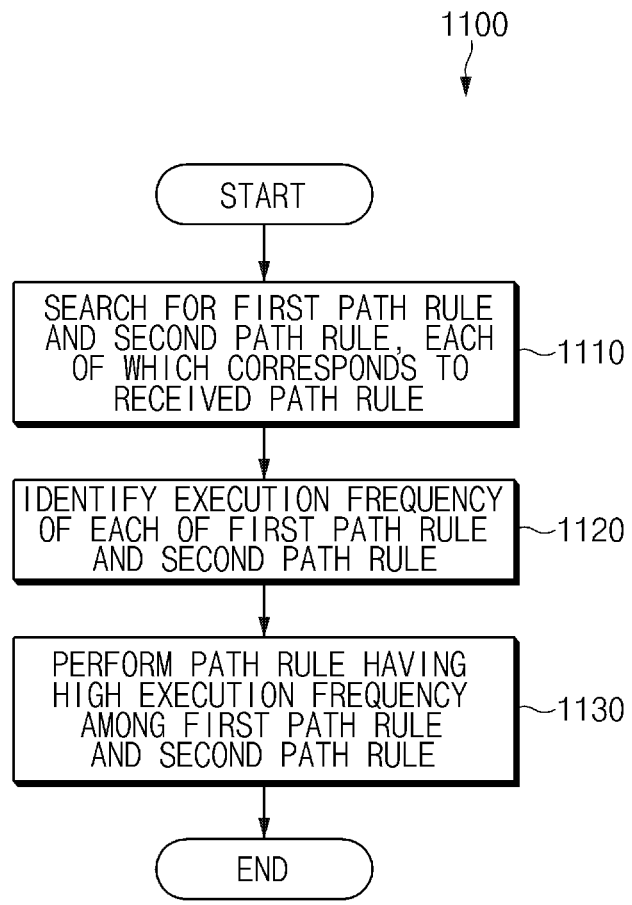
FIG. 11 is a flowchart of a method for determining a path rule to be performed among a plurality of alternative path rules, according to an embodiment.

FIG. 11 is a flowchart of a method for determining a path rule to be performed among a plurality of alternative path rules, according to an embodiment.

Referring to FIG. 11, a flowchart 1100 indicating a method for determining a path rule to be performed among a plurality of alternative path rules is illustrated. The flowchart 1100 may include step 1110 to step 1130. Step 1110 to Step 1130 may be performed by the electronic device 600 illustrated in FIG. 6.

The may be a plurality of alternative path rules corresponding to the path rule received from the intelligent server 200. At step 1110, the electronic device 600 may search for a first path rule and a second path rule, each of which corresponds to the received path rule.

At step 1120, the electronic device 600 may identify the execution frequency of each of the first path rule and the second path rule. At step 1130, the electronic device 600 may perform a path rule having a high execution frequency among the first path rule and the second path rule. The electronic device 600 may execute a path rule so as to match a user's intent, by executing a path rule that is more used by the user.

The electronic device 600 may communicate with a login server (e.g., a rubin server) via the wireless communication circuit 630. The login server may store log records such as which screen of the application program 622 has been entered, which input has been received, and the like. The electronic device 600 may receive the log records from the login server. The electronic device 600 may compare the execution frequency of each of the first path rule and the second path rule, based on the received log records.

The electronic device 600 may set a priority among a plurality of path rules based on the log records. When a log that has entered a specific screen is recorded frequently, the electronic device 600 may set the priority of the path rule including the states corresponding to the screen so as to be high. The electronic device 600 may set the priority among the path rules in advance and may store the priority.

Even though it is possible to execute the path rule first received from the intelligent server 200, the electronic device 600 may execute an alternative path rule. When the execution frequency of the alternative path rule is higher than the execution frequency of the received path rule, the user is more likely to prefer the alternative path rule. Accordingly, the electronic device 600 may be configured to execute another path rule, based on the execution frequency.

Even though it is possible to execute the path rule first received from the intelligent server 200, the electronic device 600 may execute an alternative path rule, based on the current state information. When the current execution state of the application program 622 is substantially the same as the state where most of the states included in the alternative path rule are completed, the electronic device 600 may reduce execution time by executing an alternative path rule.

Figure 12:
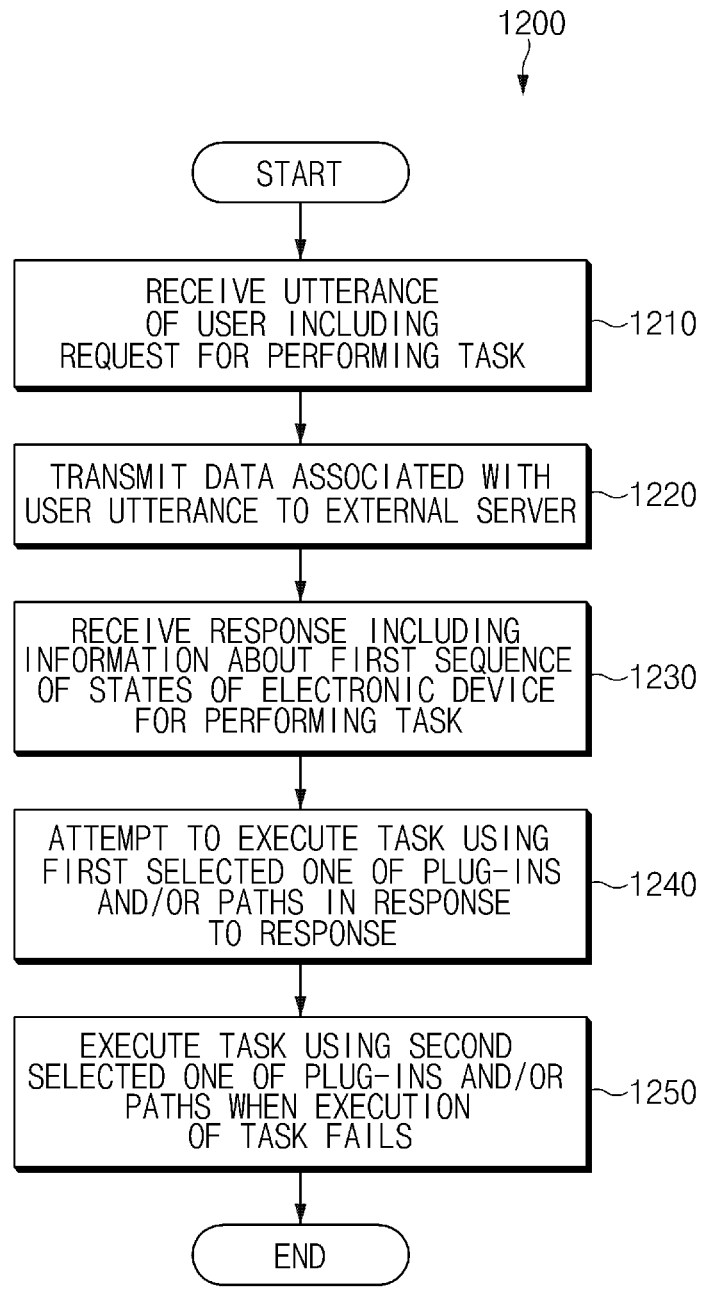
FIG. 12 is a flowchart of a method for performing a task using a plug-in or a path, according to an embodiment.

FIG. 12 is a flowchart of a method for performing a task using a plug-in or a path, according to an embodiment. Referring to FIG. 12, a flowchart 1200 illustrating a method of performing a task using a plug-in or a path rule is illustrated. The flowchart 1200 may include step 1210 to step 1250. Step 1210 to step 1250 may be performed by the electronic device 600 illustrated in FIG. 6.

The application program 622 may include a plurality of plug-ins and paths for executing a task. The electronic device 600 may store a database including a plurality of plug-ins and/or paths in the memory 620 as the part of the application program 622. The plurality of plug-ins and paths may be mapped to a specific task so as to be stored in the memory 620.

At step 1210, the electronic device 600 may receive a user's utterance including a request for performing the task of the application program 622. At step 1220, the electronic device 600 may transmit data associated with a user utterance to the external server via the communication circuit 630.

At step 1230, the electronic device 600 may receive a response including information about a first sequence of states of the electronic device 600, from the external server. The electronic device 600 may perform the task, using information about the first sequence and the application program 622.

At step 1240, the electronic device 600 may attempt to execute the task, using a first selected one of a plurality of plug-ins and/or paths of the application program 622 in response to the response. The electronic device 600 may select the first one, based on the received information about the first sequence.

When execution of the task using the first selected one fails, at step 1250, the electronic device 600 may execute the task, using a second selected one of the plurality of plug-ins and/or the paths.

The electronic device 600 may determine a second sequence of states of the electronic device, using the second selected one of the plurality of plug-ins and/or the paths.

The application program may include a payment application program. The plug-ins and/or paths associated with the payment application may be downloaded from an external server.

Figure 13:
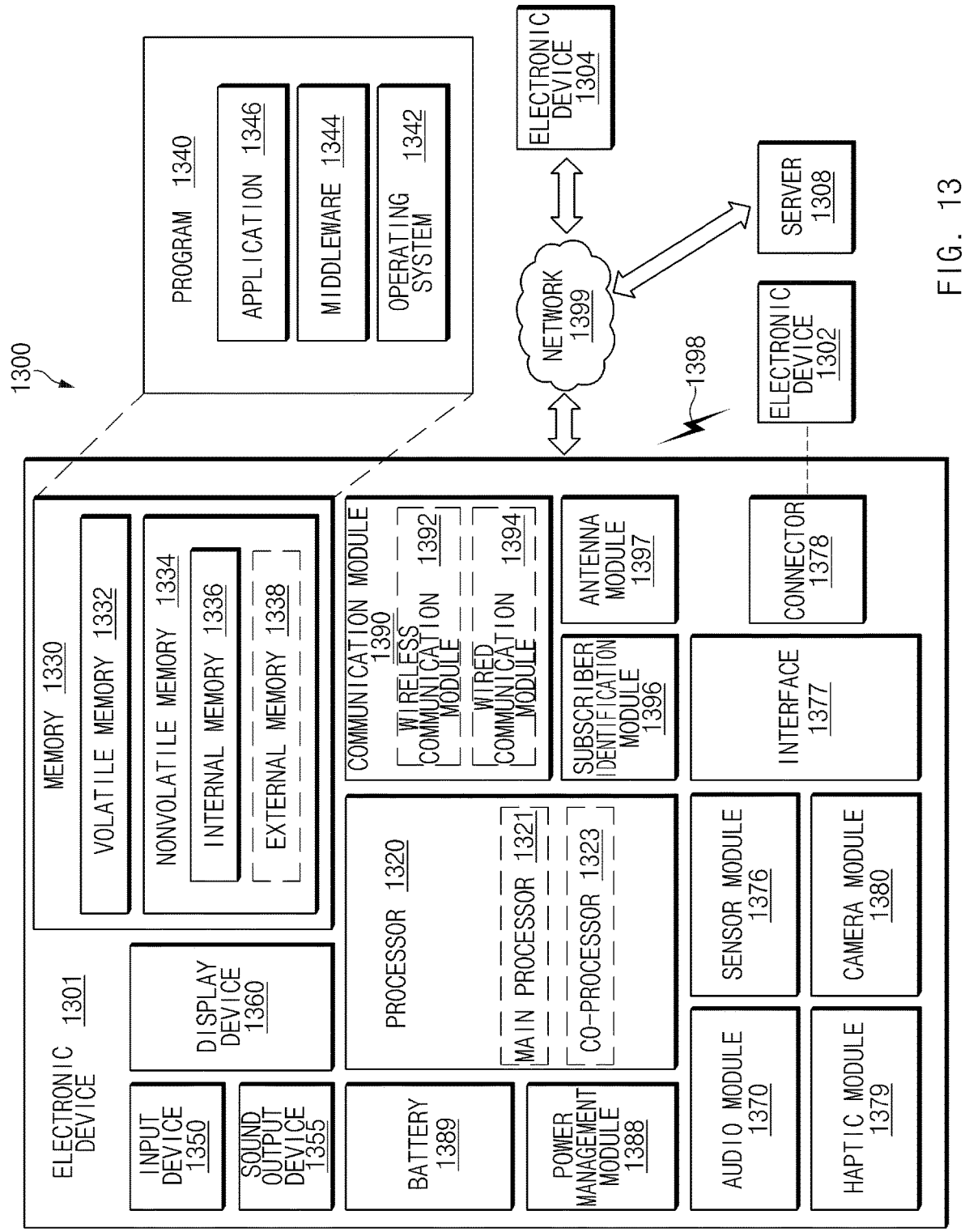
FIG. 13 illustrates an electronic device in a network environment, according to an embodiment.

FIG. 13 is a block diagram of an electronic device 1301 in a network environment 1300, according to various embodiments.

Referring to FIG. 13, the electronic device 1301 in the network environment 1300 may communicate with an electronic device 1302 over a first network 1398 (e.g., a short range wireless communication network) or may communicate with an electronic device 1304 or a server 1308 over a second network 1399 (e.g., a long distance wireless communication network). According to an embodiment, the electronic device 1301 may communicate with the electronic device 1304 through the server 1308. According to an embodiment, the electronic device 1301 may include a processor 1320, a memory 1330, an input device 1350, a sound output device 1355, a display device 1360, an audio module 1370, a sensor module 1376, an interface 1377, a haptic module 1379, a camera module 1380, a power management module 1388, a battery 1389, a communication module 1390, a subscriber identification module 1396, or an antenna module 1397. In any embodiment, at least one (e.g., the display device 1360 or the camera module 1380) of the components may be omitted from the electronic device 1301, or one or more other components may be further included in the electronic device 1301. In any embodiment, some of the components may be implemented with a single integrated circuit. For example, the sensor module 1376 (e.g., a fingerprint sensor, an iris sensor, or an illumination sensor) may be embedded in the display device 1360 (e.g., a display).

The processor 1320 may execute, for example, software (e.g., a program 1340) to control at least one other component (e.g., a hardware or software component) of the electronic device 1301 connected to the processor 1320, and may perform various data processing or operations. According to an embodiment, as at least a part of the data processing or operations, the processor 1320 may load a command or data received from any other component (e.g., the sensor module 1376 or the communication module 1390) to a volatile memory 1332, may process the command or data stored in the volatile memory 1332, and may store processed data in a nonvolatile memory 1334. According to an embodiment, the processor 1320 may include a main processor 1321 (e.g., a central processing unit or an application processor) and a coprocessor 1323 (e.g., a graphic processing device, an image signal processor, a sensor hub processor, or a communication processor), which may be operated independently of or together with the main processor 1321. Additionally or alternatively, the coprocessor 1323 may be configured to use lower power than the main processor 1321 or to be specialized for a specified function. The coprocessor 1323 may be implemented separately from the main processor 1321 or may be implemented as a part of the main processor 1321.

The coprocessor 1323 may control at least a part of a function or states associated with at least one component (e.g., the display device 1360, the sensor module 1376, or the communication module 1390) of the electronic device 1301, for example, instead of the main processor 1321 while the main processor 1321 is in an inactive (e.g., sleep) state and together with the main processor 1321 while the main processor 1321 is in an active (e.g., an application execution) state. According to an embodiment, the coprocessor 1323 (e.g., an image signal processor or a communication processor) may be implemented as a part of any other component (e.g., the camera module 1380 or the communication module 1390) which is functionally (or operatively) associated with the coprocessor 1323.

The memory 1330 may store various data which are used by at least one component (e.g., the processor 1320 or the sensor module 1376) of the electronic device 1301. The data may include, for example, software (e.g., the program 1340), or input data or output data associated with a command of the software. The memory 1330 may include the volatile memory 1332 or the nonvolatile memory 1334.

The program 1340 may be stored in the memory 1330 as software, and may include, for example, an operating system 1342, a middleware 1344, or an application 1346.

The input device 1350 may receive a commands or data which will be used by a component (e.g., the processor 1320) of the electronic device 1301, from the outside (e.g., a user) of the electronic device 1301. The input device 1350 may include, for example, a microphone, a mouse, or a keyboard.

The sound output device 1355 may output a sound signal to the outside of the electronic device 1301. The sound output device 1355 may include, for example, a speaker or a receiver. The speaker may be used for a general purpose such as multimedia play or recording play, and the receiver may be used to receive an incoming call. According to an embodiment, the receiver may be implemented separately from the speaker or may be implemented as a part of the speaker.

The display device 1360 may visually provide information to the outside (e.g., the user) of the electronic device 1301. The display device 1360 may include, for example, a display, a hologram device, or a control circuit for controlling a projector and a corresponding device. According to an embodiment, the display device 1360 may include a touch circuitry configured to sense a touch, or a sensor circuitry (e.g., a pressure sensor) configured to measure the strength of force generated by the touch.

The audio module 1370 may convert sound to an electrical signal, or reversely, may convert an electrical signal to sound. According to an embodiment, the audio module 1370 may obtain sound through the input device 1350, or may output sound through the sound output device 1355, or through an external electronic device (e.g., the electronic device 1302) (e.g., a speaker or a headphone) directly or wirelessly connected with the electronic device 1301.

The sensor module 1376 may sense an operation state (e.g., power or a temperature) of the electronic device 1301 or an external environment state (e.g., a user state), and may generate an electrical signal or a data value corresponding the sensed state. According to an embodiment, the sensor module 1376 may include, for example, a gesture sensor, a grip sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 1377 may support one or more specified protocols that may be used to directly and wirelessly connect the electronic device 1301 with an external electronic device (e.g., the electronic device 1302). According to an embodiment, the interface 1377 may include, for example, a high definition multimedia interface (HDMI), a universal serial bus (USB) interface, a secure digital (SD) card interface, or an audio interface.

A connection terminal 1378 may include a connector that may allow the electronic device 1301 to be physically connected with an external electronic device (e.g., the electronic device 1302). According to an embodiment, the connection terminal 1378 may include, for example, a HDMI connector, a USB connector, a SD card connector, or an audio connector (e.g., a headphone connector).

The haptic module 1379 may convert an electrical signal to a mechanical stimulation (e.g., vibration or movement) or an electrical stimulation which the user may perceive through the sense of touch or the sense of movement. According to an embodiment, the haptic module 1379 may include, for example, a motor, a piezoelectric sensor, or an electrical stimulation device.

The camera module 1380 may photograph a still image and a video. According to an embodiment, the camera module 1380 may include one or more lenses, image sensors, image signal processors, or flashes (or electrical flashes).

The power management module 1388 may manage the power which is supplied to the electronic device 1301. According to an embodiment, the power management module 1388 may be implemented, for example, as at least a part of a power management integrated circuit (PMIC).

The battery 1389 may power at least one component of the electronic device 1301. According to an embodiment, the battery 1389 may include, for example, a primary cell not recharged, a secondary cell rechargeable, or a fuel cell.

The communication module 1390 may establish a direct (or wired) communication channel or a wireless communication channel between the electronic device 1301 and an external electronic device (e.g., the electronic device 1302, the electronic device 1304, or the server 1308) or may perform communication through the established communication channel. The communication module 1390 may include one or more communication processors which is operated independently of the processor 1320 (e.g., an application processor) and supports direct (or wired) communication or wireless communication. According to an embodiment, the communication module 1390 may include a wireless communication module 1392 (e.g., a cellular communication module, a short range wireless communication module, or a global navigation satellite system (GNSS) communication module) or a wired communication module 1394 (e.g., a local area network (LAN) communication module or a power line communication module). A corresponding communication module of such communication modules may communicate with an external electronic device over the first network 1398 (e.g., a short range communication network such as Bluetooth, Wi-Fi direct, or infrared data association (IrDA)) or the second network 1399 (e.g., a long distance communication network such as a cellular network, an Internet, or a computer network (e.g., LAN or WAN)). The above-described kinds of communication modules may be integrated in one component (e.g., a single chip) or may be implemented with a plurality of components (e.g., a plurality of chips) which are independent of each other. The wireless communication module 1392 may verify and authenticate the electronic device 1301 within a communication network, such as the first network 1398 or the second network 1399, by using subscriber information (e.g., international mobile subscriber identity (IMSI)) stored in the subscriber identification module 1396.

The antenna module 1397 may transmit a signal or a power to the outside (e.g., an external electronic device) or may receive a signal or a power from the outside. According to an embodiment, the antenna module 1397 may include one or more antennas, and at least one antenna which is suitable for a communication scheme used in a computer network such as the first network 1398 or the second network 1399 may be selected, for example, by the communication module 1390 from the one or more antennas. The signal or power may be exchanged between the communication module 1390 and an external electronic device through the selected at least one antenna or may be received from the external electronic device through the selected at least one antenna and the communication module 1390.

At least some of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 1301 and the external electronic device 1304 through the server 1308 connecting to the second network 1399. Each of the electronic devices 1302 and 1304 may be a device, the kind of which is the same as or different from a kind of the electronic device 1301. According to an embodiment, all or a part of operations to be executed in the electronic device 1301 may be executed in one or more external devices of the external electronic devices 1302, 1304, or 1308. For example, in the case where the electronic device 1301 should perform any function or service automatically or in response to a request from the user or any other device, the electronic device 1301 may request one or more external electronic devices to perform at least a part of the function or service, instead of internally executing the function or service or additionally. The one or more external electronic devices which receive the request may execute at least a part of the function or service thus requested or an additional function or service associated with the request, and may provide a result of the execution to the electronic device 1301. The electronic device 1301 may process received result as it is or additionally, and may provide a result of the processing as at least a part of the response to the request. To this end, for example, a cloud computing, distributed computing, or client-server computing technology may be used.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

According to various embodiments, an electronic device includes a speaker, a microphone configured to receive an utterance input of a user, a communication circuit, a processor operatively connected to the communication circuit, the microphone, and the speaker and positioned inside a housing, and a memory configured to store an application program including a plurality of plug-ins and/or paths for performing a task corresponding to the utterance input, wherein the memory stores instructions that, when executed, cause the processor to receive the utterance input including a request for performing the task, via the microphone, transmit data associated with the utterance input, to an external server via the communication circuit, receive a response including information about a first sequence of states of the electronic device, from the external server via the communication circuit to perform the task using the application program, attempt to perform the task, using a first selected one of the plurality of plug-ins and/or the paths in response to the response, and when execution of the task using the first selected one fails, perform the task, using a second selected one of the plurality of plug-ins and/or the paths.

According to various embodiments, the memory stores the instructions that, when executed, cause the processor to store a database including the plurality of plug-ins and/or the paths in the memory, as a part of the application program.

According to various embodiments, 3 the memory stores the instructions that, when executed, cause the processor to determine a second sequence of states of the electronic device, using the second selected one of the plurality of plug-ins and/or the paths.

According to various embodiments, the memory stores the instructions that, when executed, cause the processor to use parameters associated with the first sequence of states, with respect to the second sequence of states.

According to various embodiments, the application program includes a payment application program, and the plurality of plug-ins and/or the paths are downloadable from the external server.

According to various embodiments, an electronic device includes a microphone, a wireless communication circuit, at least one processor, and a memory configured to store an application program supporting a task and a database including a first path rule for performing the task, wherein the first path rule includes a plurality of first states of the electronic device, wherein the memory stores instructions that, when executed, cause the at least one processor to receive a voice command making a request for performing the task, via the microphone, transmit the voice command to an external server via the wireless communication circuit, receive a second path rule including a plurality of second states of the electronic device for performing the task, from the external server via the wireless communication circuit, execute the plurality of second states included in the second path rule, in response to the reception of the second path rule, and when an error occurs during the execution of the plurality of second states, execute at least part of the plurality of first states included in the first path rule.

According to various embodiments, the first path rule is stored after being mapped to the second path rule.

According to various embodiments, the database is configured to store a table including mapping information of the first path rule and the second path rule.

According to various embodiments, the electronic device further includes a display, wherein the memory stores the instructions that, when executed, cause the at least one processor to output an interface for obtaining an approval input for the execution of the at least part of the plurality of first states, via the display, and execute the at least part of the plurality of first states, in response to the approval input obtained based on the interface.

According to various embodiments, the electronic device further includes a speaker, wherein the memory stores the instructions that, when executed, cause the at least one processor to output a voice message for obtaining an approval input for the execution of the at least part of the plurality of first states, via the speaker, and execute the at least part of the plurality of first states, in response to the approval input obtained based on the output of the voice message.

According to various embodiments, at least part of the plurality of second states includes at least one second parameter, and the memory stores the instructions that, when executed, cause the at least one processor to execute the at least part of the plurality of first states, based on the at least one second parameter.

According to various embodiments, the memory stores the instructions that, when executed, cause the at least one processor to determine at least one first parameter included in the plurality of first states, based on the at least one second parameter.

According to various embodiments, the memory stores the instructions that, when executed, cause the at least one processor to receive information about a parameter, which is not determined based on the second parameter, from among the at least one first parameter from the external server.

According to various embodiments, the database further includes a third path rule, which is stored after being mapped to the second path rule, for performing the task, and the memory stores the instructions that, when executed, cause the at least one processor to when an error occurs during the execution of the plurality of second states, search for the first path rule and the third path rule, which correspond to the second path rule, and execute the at least part of the plurality of first states included in the first path rule determined based on an execution frequency of each of the found the first path rule and the found third path rule.

According to various embodiments, the plurality of second states includes a state executed by a plug-in provided by an application program different from the application program, and the memory stores the instructions that, when executed, cause the at least one processor to when the plug-in is not installed, execute the at least part of the plurality of first states.

According to various embodiments, the memory stores the instructions that, when executed, cause the at least one processor to obtain installation information of the plug-in from a state check server, when determining that it is impossible to execute the second path rule, based on the installation information before the execution of the plurality of second states, execute the at least part of the plurality of first states.

According to various embodiments, the memory stores the instructions that, when executed, cause the at least one processor to obtain state information of the plurality of second states, and execute the at least part of the plurality of first states determined based on the state information.

According to various embodiments, the plurality of first states and the plurality of second states include at least one common state, and the memory stores the instructions that, when executed, cause the at least one processor to when execution of the at least one common state is completed by executing the plurality of second states based on the state information, execute at least part of the remaining states other than the at least one common state, among the plurality of first states.

According to various embodiments, the memory stores the instructions that, when executed, cause the at least one processor to when the execution of the at least part of the plurality of first states is completed, transmit a completion message for the voice command, to the external server.

According to various embodiments, the memory stores the instructions that, when executed, cause the at least one processor to transmit the completion message for the second path rule to the external server.

When an error according to processing the instruction received from an external server occurs, the electronic device according to various embodiments of the disclosure may deviously process the instruction.

The electronic device according to various embodiments of the disclosure may provide a response or a result in consideration of both a user's intent included in the voice command of the user and the execution environment of the function matched to the intent.

Besides, a variety of effects directly or indirectly understood through this disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
  a speaker;
  a microphone configured to receive an utterance input of a user;
  a communication circuit;
  a processor operatively connected to the communication circuit, the microphone, and the speaker and positioned inside a housing; and
  a memory configured to store an application program including a plurality of plug-ins and/or paths for performing a task corresponding to the utterance input, wherein the memory stores instructions that, when executed, cause the processor to:
  receive the utterance input including a request for performing the task via the microphone;

transmit data associated with the utterance input to an external server via the communication circuit;
receive a response including information about a first sequence of states of the electronic device from the external server via the communication circuit to perform the task using the application program;
execute a first application,
attempt to perform the task using a plug-in of a second application different from the first application in response to the response; and
when execution of the task using the second application fails, perform the task by a second sequence of states executed in the first application.

2. The electronic device of claim 1, wherein the instructions, when executed, further cause the processor to:
store a database including the plurality of plug-ins and/or the paths in the memory as a part of the application program.

3. The electronic device of claim 1, wherein the instructions, when executed, further cause the processor to:
determine the second sequence of states of the electronic device using the plurality of plug-ins and/or the paths.

4. The electronic device of claim 3, wherein the instructions, when executed, further cause the processor to:
use parameters associated with the first sequence of states with respect to the second sequence of states.

5. The electronic device of claim 1, wherein the application program includes a payment application program, and
wherein the plurality of plug-ins and/or the paths are downloadable from the external server.

6. An electronic device comprising:
a microphone;
a wireless communication circuit;
at least one processor; and
a memory configured to store an application program supporting a task and a database including a first path rule for performing the task, wherein the first path rule includes a plurality of first states of the electronic device,
wherein the memory stores instructions that, when executed, cause the at least one processor to:
receive a voice command making a request for performing the task via the microphone;
transmit the voice command to an external server via the wireless communication circuit;
receive a second path rule including a plurality of second states of the electronic device for performing the task from the external server via the wireless communication circuit;
execute a first application corresponding to the second path rule;
execute the plurality of second states included in the second path rule, in response to the reception of the second path rule; and
when an error occurs during the execution of the plurality of second states, execute a second application corresponding to the first path rule and execute at least part of the plurality of first states included in the first path rule.

7. The electronic device of claim 6, wherein the first path rule is stored after being mapped to the second path rule.

8. The electronic device of claim 6, wherein the database is configured to:
store a table including mapping information of the first path rule and the second path rule.

9. The electronic device of claim 6, further comprising:
a display,
wherein the instructions, when executed, further cause the at least one processor to:
output an interface for obtaining an approval input for the execution of the at least part of the plurality of first states via the display; and
execute the at least part of the plurality of first states, in response to the approval input obtained based on the interface.

10. The electronic device of claim 6, further comprising:
a speaker,
wherein the instructions, when executed, further cause the at least one processor to:
output a voice message for obtaining an approval input for the execution of the at least part of the plurality of first states, via the speaker; and
execute the at least part of the plurality of first states, in response to the approval input obtained based on the output of the voice message.

11. The electronic device of claim 6, wherein at least part of the plurality of second states includes at least one second parameter, and
wherein the instructions, when executed, further cause the at least one processor to:
execute the at least part of the plurality of first states, based on the at least one second parameter.

12. The electronic device of claim 11, wherein the instructions, when executed, further cause the at least one processor to:
determine at least one first parameter included in the plurality of first states, based on the at least one second parameter.

13. The electronic device of claim 12, wherein the instructions, when executed, further cause the at least one processor to:
receive information about a parameter, which is not determined based on the second parameter, from among the at least one first parameter from the external server.

14. The electronic device of claim 6, wherein the database further includes a third path rule, which is stored after being mapped to the second path rule, for performing the task, and
wherein the instructions, when executed, further cause the at least one processor to:
when an error occurs during the execution of the plurality of second states, search for the first path rule and the third path rule, which correspond to the second path rule; and
execute the at least part of the plurality of first states included in the first path rule determined based on an execution frequency of each of the found the first path rule and the found third path rule.

15. The electronic device of claim 6, wherein the plurality of second states includes a state executed by a plug-in provided by an application program different from the application program, and
wherein the instructions, when executed, further cause the at least one processor to:
when the plug-in is not installed, execute the at least part of the plurality of first states.

16. The electronic device of claim 15, wherein the instructions, when executed, further cause the at least one processor to:
obtain installation information of the plug-in from a state check server;
when determining that it is impossible to execute the second path rule, based on the installation information before the execution of the plurality of second states, execute the at least part of the plurality of first states.

17. The electronic device of claim 6, wherein the instructions, when executed, further cause the at least one processor to:

obtain state information of the plurality of second states; and execute the at least part of the plurality of first states determined based on the state information.

18. The electronic device of claim 17, wherein the plurality of first states and the plurality of second states include at least one common state, and wherein the instructions, when executed, further cause the at least one processor to:

when execution of the at least one common state is completed by executing the plurality of second states based on the state information, execute at least part of the remaining states other than the at least one common state, among the plurality of first states.

19. The electronic device of claim 6, wherein the instructions, when executed, further cause the at least one processor to:

when the execution of the at least part of the plurality of first states is completed, transmit a completion message for the voice command, to the external server.

20. The electronic device of claim 19, wherein the instructions, when executed, further cause the at least one processor to:

transmit the completion message for the second path rule to the external server.

* * * * *